United States Patent [19]

Zhang et al.

[11] Patent Number: 5,501,801

[45] Date of Patent: Mar. 26, 1996

[54] METHOD AND APPARATUS FOR DESTROYING ORGANIC COMPOUNDS IN FLUID

[75] Inventors: Yin Zhang; John C. Crittenden; David W. Hand, all of Houghton; David L. Perram, Allouez, all of Mich.

[73] Assignee: Board of Control of Michigan Technology University, Houghton, Mich.

[21] Appl. No.: 160,102

[22] Filed: Nov. 30, 1993

[51] Int. Cl.$^6$ .................................................. C02F 1/48
[52] U.S. Cl. ........................................ 210/748; 210/763
[58] Field of Search .................................. 210/763, 748, 210/908, 909

[56] References Cited

U.S. PATENT DOCUMENTS

| | | | |
|---|---|---|---|
| 4,303,486 | 12/1981 | Bard et al. | 204/162 |
| 4,774,026 | 9/1988 | Kitamori et al. | 252/627 |
| 4,861,484 | 8/1989 | Lichtin et al. | 210/638 |
| 4,888,101 | 12/1989 | Cooper | 204/157.15 |
| 4,892,712 | 1/1990 | Robertson et al. | 422/186 |
| 4,943,357 | 7/1990 | Van Antwerp et al. | 204/157.15 |
| 4,954,465 | 9/1990 | Kawashima et al. | 502/5 |
| 4,997,576 | 3/1991 | Heller et al. | 210/748 |
| 5,035,784 | 7/1991 | Anderson et al. | 204/158.14 |
| 5,045,288 | 9/1991 | Raupp et al. | 422/186.3 |
| 5,137,607 | 8/1992 | Anderson et al. | 204/59 |

FOREIGN PATENT DOCUMENTS

| | | | |
|---|---|---|---|
| 7074 | 7/1987 | Australia | 210/748 |
| 0306301 | 8/1989 | European Pat. Off. | |
| 0401884 | 12/1990 | European Pat. Off. | |
| WO91/04094 | 4/1991 | WIPO | |
| WO91/09823 | 7/1991 | WIPO | |

OTHER PUBLICATIONS

Suri, Liu, Hand, Crittenden, Perram and Mullins; Heterogeneous Photocatalytic Oxidation of Hazardous Organic Contaminants in Water; 1991.

*Primary Examiner*—Neil McCarthy
*Attorney, Agent, or Firm*—Michael, Best & Friedrich

[57] ABSTRACT

An apparatus for the photocatalytic oxidation of organic contaminants in fluid includes a reactor and a photocatalyst affixed to support material. Preferably, the outer wall of the reactor is constructed of material transmissive of ultraviolet radiation. The support material preferably is transmissive of ultraviolet radiation. The support material can also be an adsorbent material. Also, a method for photocatalytic oxidation of organic contaminants in fluid. Also, a method for preparation of a supported photocatalyst. Also, a supported photocatalyst adapted for the photocatalytic oxidation of organic contaminants in fluid. Also, a method for preparing a photocatalyst adapted for the photocatalytic oxidation of organic contaminants in fluid.

23 Claims, 17 Drawing Sheets

METHOD AND APPARATUS FOR DESTROYING ORGANIC COMPOUNDS IN FLUID

FIELD OF THE INVENTION

The invention relates to fluid treatment methods and apparatus. More particularly, it relates to methods and apparatus for destroying organic compounds in fluid by photocatalytic oxidation.

BACKGROUND OF THE INVENTION

Two major conventional methods for the removal of organic contaminants from water are: (1) adsorption technologies employing granular activated carbon (GAC) or synthetic adsorbents, and (2) air stripping. A primary problem of both adsorption and air stripping processes is that they are nondestructive technologies, in that the organic contaminants are only transferred from one media to another, and are not destroyed to nontoxic matters. Therefore, the media into which the organic compounds are transferred, the GAC or synthetic adsorbent in adsorption processes and the air in air stripping processes, may require further treatment.

New regulations for air, water and solid residuals are stimulating researchers to search for new treatment technologies that either destroy or immobilize toxic organic compounds. Considerable research is being directed at effective and economical treatment strategies to meet the new standards. Advanced oxidation processes (AOPs) are alternative processes which destroy organic compounds and turn them into nontoxic forms, such as carbon dioxide ($CO_2$) and water. AOPs involve the generation of highly reactive radicals, such as the hydroxyl radical (OH.), which are responsible for the destruction of the organic compounds. AOPs can be classified into two major groups: AOPs involving homogeneous reactions using hydrogen peroxide ($H_2O_2$), ozone ($O_3$), and ultraviolet (UV) light, alone or in any combination; and AOPs employing heterogeneous reactions using photoactive catalysts, such as semiconductors like titanium dioxide ($TiO_2$). In the latter case—the photocatalytic oxidation processes—photoactive semiconductor catalysts are immersed in an oxygenated aqueous solution and illuminated with UV radiation, so that a redox environment is established which causes the oxidation of organic compounds.

The primary oxidant responsible for the photocatalytic oxidation of organic compounds in aqueous solutions is believed to be the highly reactive hydroxyl radical (OH.), although direct reactions of adsorbed organic compounds with surface species such as holes have also been reported [Völz et al., 1981; Ceresa et al., Matthews, 1984; and Turchi and Ollis, 1990]. The proposed mechanisms and pathways for the formation of the hydroxyl radical have also been discussed in the literature. When a photoactive semiconductor is illuminated with photons of sufficient energy (band gap energy, or greater), a photon (hv) excites an electron from the valance band, overcoming the energy band-gap to the conduction band, and leaves an electronic vacancy, a hole ($h^+$), in the valance band. The band-gap energy is the minimum amount of energy required for exciting the electron. For example, anatase form $TiO_2$ has a band-gap energy of about 3.2 eV, which is equivalent to the photon energy of UV light with a wavelength of 387 nm. Consequently, anatase form $TiO_2$ can be activated by radiation with wavelengths less than 387 nm. The valance band hole and the conduction band electron may recombine either in the bulk of the semiconductor or at the external surface, producing heat or luminescence. Only the excited electrons and the resulting holes which survive the recombination may take part in the redox process with adsorbed species such as $H_2O$, $OH^-$, organic compounds, and $O_2$ at the water-solid interface. The holes may take part in the oxidation half reactions with adsorbed $H_2O$ or $OH^-$ and form hydroxyl radicals. The electrons take part in the reduction half reactions with adsorbed $O_2$ to produce the superoxide radical $O._2$, which may also, in turn, produce $H_2O_2$ and OH. [Okamoto et al., 1985].

More than 700 organic compounds have been identified in sources of drinking water in the United States [Stachka and Pontius, 1984] and elsewhere. Many water utilities, companies and government agencies must also remove or destroy organic compounds from polluted groundwater supplies before those groundwater supplies can be used as drinking water. Additionally, many drinking water utilities are faced with the formation of disinfection by-products in finished water. Disinfection by-products are compounds formed in the water treatment process as a result of the disinfection step. In this step, a disinfectant such as chlorine is added to source water, where it reacts with a portion of the background organic matter (BOM) present in the source water to produce disinfection by-products. The reactive portions of the BOM are referred to as disinfection by-product precursors (DBP precursors).

U.S. Pat. No. 5,182,030 to Crittenden et al. discloses treating water by two separate steps using adsorbent materials impregnated with photocatalysts. In the first step, the photocatalyst-impregnated adsorbent materials are placed in a fixed bed to adsorb and remove organic compounds from contaminated water. In the second step, the impregnated adsorbent materials containing the adsorbed organic contaminants are regenerated by exposing them to UV radiation in a separate reactor.

U.S. Pat. No. 4,863,608 to Kawai et al. discloses a process step for preparing ultra pure water by purifying water including a small amount, particularly a trace amount on the order of several milligrams of carbon per liter (C/L) or less, of organic impurities included in total organic carbon (TOC). The process step is incorporated into known multi-step processes for the preparation of ultra pure water, the known processes comprising the steps of (a) one or more mechanical filtration steps followed by (b) a series of known purification steps essentially for the removal of residual solid particulates, such as reverse osmosis, adsorption on ion exchange resins, adsorption on activated carbon, ultrafiltration, UV sterilization, and microfiltration. The new step is incorporated into step (b) and comprises irradiating the water to be treated with light in the presence of a photocatalyst comprising an inorganic semiconductor selected from $TiO_2$, $SrTiO_3$ and CdS in fine particulate form and a noble metal and/or an oxide thereof selected from Pt, Pd, Ru, $RuO_2$ and Rh deposited on the semiconductor particles for a period sufficient to oxidatively decompose the organic impurities. The new step results in a decrease in TOC content of the water to a level below the minimum detection level of TOC detectors, typically <0.05 mg C/L or <0.01 mg C/L depending upon the particular detector employed.

U.S. Pat. No. 4,861,484 to Lichtin et al. discloses a process for degrading organic compounds in a water-containing fluid. The fluid is combined with a peroxide and a solid catalyst comprising at least one transition element to form a reaction mixture, and photoenergy is added to the reaction mixture to yield environmentally compatible reaction products comprising at least carbon dioxide. The photoenergy is preferably in the visible or ultraviolet light ranges which are absorbable by the catalyst.

SUMMARY OF THE INVENTION

The invention provides improvements in the destruction of organic compounds in fluid by photocatalytic oxidation.

More particularly, the invention provides an apparatus for the photocatalytic oxidation of organic contaminants in fluid. The apparatus includes a reactor and a photocatalyst affixed to support material. In an embodiment adapted for use with sunlight as the source of UV radiation, the apparatus further includes a reflector panel for enhancing sunlight utilization. The apparatus can also include a light source for producing ultraviolet radiation. Preferably, the outer wall of the reactor is constructed of material transmissive of ultraviolet radiation. The support material preferably is also transmissive of ultraviolet radiation. The support material can also be an adsorbent material. The fluid can be a source of drinking water, and the organic contaminants can be disinfectant by-product precursors.

The invention also provides a method for photocatalytic oxidation of organic contaminants in fluid. The method includes the steps of: providing a photocatalyst fixed on a support material in the reactor; introducing fluid to be treated into a reactor for contact with the supported photocatalyst; and exposing the fluid and photocatalyst to ultraviolet radiation for a period sufficient to destroy the organic contaminants to a desired degree. The source of UV radiation can be sunlight or artificial light. The fluid can be a source of drinking water, and the organic contaminants can be disinfectant by-product precursors.

The invention also provides a method for preparation of a supported photocatalyst for photocatalytic oxidation of organic contaminants in fluid. The method includes the steps of: cleaning the surface of a support material; mixing photocatalyst powder with water to form a slurry; contacting the slurry with the support material to form a mixture; drying the mixture; and calcining the dried mixture. Preferably, the mixture is dried in air at about ambient temperature. Preferably, the dried mixture is calcined in air at a temperature in the range of about 250° C. to about 1000° C., more preferably about 600° C., for a period in the range of about 1 hour to about 72 hours, more preferably for about 24 hours. The supported photocatalyst is suitable for photocatalytic oxidation of disinfectant by-product precursors in drinking water. The fluid can be a source of drinking water, and the organic contaminants can be disinfectant by-product precursors.

The invention also provides a supported photocatalyst adapted for the photocatalytic oxidation of organic contaminants in fluid. The supported photocatalyst comprises a particulate support material having an outer surface and photocatalyst particles affixed to the outer surface of the support material. The fluid can be a source of drinking water, and the organic contaminants can be disinfectant by-product precursors.

The invention provides a method for preparing a photocatalyst adapted for the photocatalytic oxidation of organic contaminants in fluid. The photocatalyst is particularly adapted for the destruction of disinfectant by-product precursors in drinking water. The method includes the steps of: synthesizing $TiO_2$ powder, preferably by the sol-gel process, and more preferably by the low temperature sol-gel process; and calcining the $Pt-TiO_2$ in air at a temperature ranging from about 250° C. to about 450° C., preferably about 350° C., for a period ranging from about 1 hour to about 72 hours, preferably for about 24 hours. The surface of the $TiO_2$ powder can be modified with an amount of platinum in the range from about 0.01 weight % to about 10 weight preferably at least about 1 weight %, based on the weight of the $TiO_2$ powder. More preferably, the $TiO_2$ is synthesized by the low temperature sol-gel process, and is surface modified by photo-reduction of Pt from a platanic acid.

DETAILED DESCRIPTION OF A PREFERRED EMBODIMENT

Figure 1:
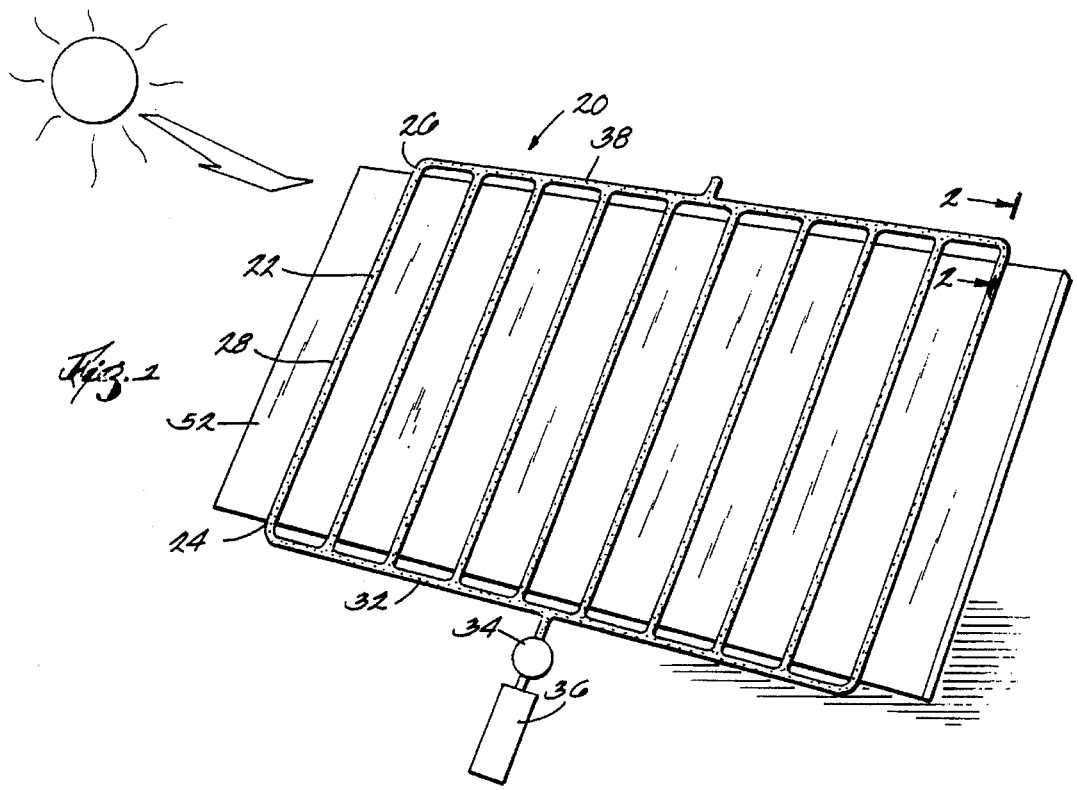
FIG. 1 is a schematic drawing of an apparatus for destroying organic contaminants in fluid by solar-driven photocatalytic oxidation.
Figure 2:
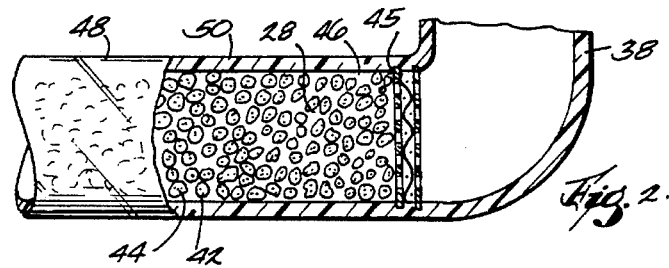
FIG. 2 is an enlarged partial cross sectional view taken generally along line 2—2 in FIG. 1.

Shown in FIGS. 1–2 is an apparatus 20 of the invention for photocatalytic oxidation of organic contaminants in fluid. The apparatus 20 includes a reactor 22. The reactor 22 includes opposed first and second end portions 24 and 26 and a treatment zone 28. In other embodiments of the invention, the reactor 22 may be configured differently, such as, for example, an open-top or covered shallow tank. The first end portion 24 is connected to a fluid inlet manifold 32 for introducing fluid to be treated into the treatment zone 28. The fluid inlet manifold 32 is connected by a pump 34 to a source 36 of fluid to be treated. The second end portion 26 is connected to a fluid outlet manifold 38 for removing treated fluid from the treatment zone 28. In the illustrated embodiment, the treatment zone 28 of the reactor 22 is a plurality of tubular members 39 connected to the manifolds 32 and 38 and each having an outer wall 48 constructed of UV transmissive material 50.

The reactor 22 also includes a photocatalyst 42 affixed to a particulate support material 44 and disposed in the treatment zone 28. Preferably, the photocatalyst 42 is affixed to the particulate support material 44 as described in further detail below. As used herein, "particulate support material" includes particles, filaments, fibers, threads, gels, granules, mats and any other material suitable for supporting the photocatalyst 42. In the illustrated embodiment of the invention, the photocatalyst 42 and support material 44 occupy about 60% of the volume of the treatment zone 28. The remainder of the treatment zone 28 comprises void spaces 46 through which the fluid flows. The photocatalyst 42 and support material 44 are retained in the treatment zone 28 by screens 45 at each end portion 24 and 26. The screens 45 prevent movement of the photocatalyst 42 and support material 44 from the treatment zone 28 while also permitting fluid to pass therethrough.

The apparatus 20 also includes means for exposing the photocatalyst 42 and fluid to UV radiation while the fluid is in contact with the photocatalyst 42 in the treatment zone 28. In the illustrated embodiment, the exposing means includes the tubular members 39 each having an outer wall 48 constructed of UV transmissive material 50. As used herein and set forth in further detail below, "UV transmissive" means that the material transmits a substantial fraction of incident ultraviolet radiation (UV). In the illustrated embodiment, sunlight is the source of UV radiation, and the apparatus 20 includes a reflector panel 52 exterior to the reactor 20 for directing sunlight including UV radiation toward the UV transmissive outer walls 48 of the tubular members 39. Although the reflector panel 52 is not necessary, if used the reflector panel 52 can be constructed of any suitable material reflective of incident UV radiation, in the illustrated embodiment of the invention the reflector panel 52 is a polished metal sheet. Sunlight can serve as the source of UV radiation under a wide variety of weather conditions and across a wide range of times of the year. The apparatus may also include UV light sources (not shown) mounted in sufficient proximity to the reactor 22 to enable operation at night or under other dark conditions.

In operation, fluid containing organic contaminants is introduced into the treatment zone 28 of the reactor 22 from the fluid inlet manifold 32 and flows through the tubular members 39 toward the fluid outlet manifold 38. In the tubular members 39, the fluid contacts the photocatalyst 42 and, when the reactor 22 is exposed to sunlight, the fluid and photocatalyst 42 are simultaneously exposed to UV radiation transmitted through the UV transmissive outer walls 48. When the photocatalyst 42 and fluid are exposed to UV radiation, oxidation processes are initiated which destroy the organic contaminants.

The wall material 50 is transmissive of incident UV radiation. As used herein, "outer wall" means any wall of a reactor 22 through which UV radiation must pass to reach the photocatalyst 42. If UV radiation must pass through the wall to reach the treatment zone 28, the wall material 50 should be transmissive of UV radiation. Preferably the wall material 50 in the thickness used to construct the reactor 22 is transmissive of at least about 20%, more preferably at least about 45%, of incident UV radiation when overall efficiency is considered. Preferably the wall material 30 is glass, plastic or quartz. A commercially available material which is particularly suitable for this use is M-7® plastic marketed by American Energy Technologies (Green Cove Springs, Fla.). M-7® plastic is chemically stable, and ⅛" thick sheets of M-7® transmit more than 80% of UV radiation. M-7® plastic tubing having a wall thickness of about ¹⁄₁₆" is highly suitable for constructing each tubular member 39 illustrated in FIG. 1.

The photocatalyst 42 can include any suitable photoactive semiconductor catalyst, and may consist of more than one photoactive semiconductor catalyst. Examples of suitable photoactive semiconductor catalysts include $TiO_2$, ZnO, $SnO_2$, $KTaO_2$, $SrTiO_3$, $Nb_2O_5$, SiC, $V_2O_5$, $WO_3$, CdS, GaP, CdO, and CdSe. Photoactive semiconductor catalysts, among others, preferred for use in the invention include various forms of commercially available $TiO_2$. For example, suitable commercially available $TiO_2$ powders include the high purity (99.9+%) $TiO_2$ anatase powder marketed by Aldrich Chemical Co. (Milwaukee, Wis.), the Degussa P25 $TiO_2$ anatase powder marketed by Degussa Chemical Co. (Ridgefield Park, N.J.), the Idemitsu ultra fine $TiO_2$ (rutile) powder marketed by ICD Chemical Division (Lyndhurst, N.J.), a 99.9% pure grade $TiO_2$ anatase powder marketed by Cerac, Inc. (Milwaukee, Wis.), and an anhydrous $TiO_2$ powder marketed by Fisher Scientific Company (Fair Lawn, N.J.). A preferred photocatalyst 42 is $TiO_2$ powder in the anatase crystalline form. Table 1 is a representative, nonexhaustive listing of organic compounds capable of being destroyed with such photoactive semiconductor catalysts.

TABLE 1

| Organic Compounds Degraded by Photoactive Semiconductor Catalysts | |
| --- | --- |
| ALKANES AND THEIR DERIVATIVES: | Oxygen Substituted and Carbon Substituted Alkylsalicylic |
| Straight Chain Alkanes (such as octane, decane, | Acids |

TABLE 1-continued

Organic Compounds Degraded by Photoactive Semiconductor Catalysts

| | |
|---|---|
| and hexadecane) | Chlorobiphenyls |
| Branched Chain Alkanes (such as isooctanes) | Dichlorobiphenyls |
| Cycloalkanes (such as cyclohexane) | Polychlorobiphenyls |
| ARENES AND THEIR DERIVATIVES | Ring-Chlorinated Phenylacetic Acids |
| Benzene | Dichlorodiphenyltrichloroethane (DDT) |
| Alkylbenzenes (such as toluene and xylenes) | OLEFINS AND UNSATURATED HALIDES: |
| Phenol | Simple Alkenes |
| Oxygen Substituted and Carbon Substituted Alkylphenol | Alkaline |
| Aniline | Vinyl Chloride |
| Nitrogen Substituted and Carbon Substituted | Vinyl Bromide |
| Alkylanilines | Dichloroethylenes |
| Catechol | Trichloroethylene |
| Oxygen Substituted and Carbon Substituted | Tetrachloroethylene |
| Alkylcatechols | ALKYLHALIDES: |
| Resorciinol | Dichloroethanes and Dibromoethanes |
| Oxygen Substituted and Carbon Substituted | Trichloroethanes and Tribromoethanes |
| Alkylresoreinols | Tetrachloroethanes and Tetrabromoethanes |
| Cresols | $CFCl_3$, $CF_2CL_2$, and Other Chlorofluorocarbons |
| Oxygen Substituted and Carbon Substituted Alkylcresols | Methyl Chloride and Methyl Bromide |
| Hydroquinone | Methylene Dichloride and Methylene Dibromide |
| Oxygen Substituted and Carbon Substituted | Chloroform and Bromoform |
| Alkylhydroquinones | Carbon Tetrachloride and Carbon Tetrabromide |
| Benzyl Chlorides | EXAMPLES OF OTHER CLASSES: |
| Chlorobenzenes | Chlorinated Dioxins |
| Alkylchlorobenzenes | Chlorinated Dibenzofurans |
| Dichlorobenzenes | Trichloroacetic Acid |
| Alkyldichlorobenzenes | Alkyl and Aryl Thiocarbamates |
| Polychloroalkylbenzenes | Alkyl and Aryl Amines |
| Nitrobenzene | Alkyl and Aryl Mercaptans |
| Alkylnitrobenzenes | Alkyl and Aryl Thioethers |
| Dinitrotoluenes | Polymeric Materials Related to Any or All of the Above |
| Chlorophenois | Classes |
| Oxygen Substituted and Carbon Substituted | |
| Alkyichlorophenols | |
| Polychlorophenois | |
| Oxygen Substituted and Carbon Substituted | |
| Alkyipolychlorophenols | |
| Diphenyiethylene | |
| Stilbenes | |
| Naphthalene | |
| Chloronaphthalenes | |
| Alkylnaphthalene | |
| Naphthols | |
| Oxygen Substituted and Carbon Substituted | |
| Alkylnaphthols | |
| Chloronaphthols | |
| Benzoic Acid | |
| Oxygen Substituted and Carbon Substituted Alkylbenzoic | |
| Acid | |
| Salicylic Acid | |

The photoactive semiconductor catalyst can be surface modified and/or substitution doped with various metals alone or in combination, such as zirconium (Zr), vanadium (V), niobium (Nb), iron (Fe), molybdenum (Me), ruthenium (Ru), cobalt (Co), tantalum (Ta), osmium (Os), chromium (Cr), zinc (Zn), strontium (Sr), silver (Ag), gold (Au), platinum (Pt), copper (Cu), palladium (Pd), nickel (Ni), and ruthenium (Ru). Platinum (Pt) is preferred to modify the surface of the photoactive semiconductor catalyst. A photoactive semiconductor catalyst whose surface has been modified in this manner will have charge separation enhanced at the surface and, in turn, provide more efficient destruction of organic compounds. The quantity of metals used will vary depending on which are used, and which photoactive semiconductor catalysts are used. Preferably at least about 0.01 weight %, up to any desired amount of metals can be used. A preferred photocatalyst 42 is $TiO_2$ whose surface has been modified by photo-reduction of Pt onto the surface from hexachloroplatanic acid according to the method of Bard et al. [1981]. Another preferred photocatalyst 42 is $TiO_2$ whose surface has been modified by photo-reducing Ag from silver nitrate according to a similar method. More preferably, the surface-modified photocatalyst 42 is about 1 weight % platinized anatase $TiO_2$. Most preferably, the surface-modified photocatalyst 42 is about 1 weight % platinized anatase $TiO_2$ prepared according to the method set forth in detail below.

Certain other substances, such as organic dyes, polyvinyl alcohol and others, may also be incorporated onto the surface of the photocatalyst 42 in order to sensitize it to the visible light range, stabilize the photocatalyst in aqueous solution, or for other purposes.

The support material 44 can be any material suitable for supporting the photocatalyst 42, including either opaque or UV transmissive material. For example, the support material 44 can be an opaque adsorbent material such as granular activated carbon (GAC), synthetic adsorbent or zeolites. Preferably, about a 2 millimeter thickness of the support material 44 is transmissive of at least about 1% more preferably at least about 45%, of incident UV radiation. Preferably, the support material 44 is also configured in a shape providing a large specific area for attachment of the photocatalyst 42. More preferably, the support material 44 is silica gel, glass beads, glass fibers or glass wool. The support material 44 can also be sand. The most preferred support material 44 is 35–60 mesh Davisil™ silica gel, which is available from Aldrich Chemical Co. (Milwaukee, Wis.). A 2 millimeter thick layer of Davisil™ silica gel is transmissive of about 45% of incident UV radiation. The amount of photocatalyst 42 affixed to the support material 44 preferably ranges from about 0.01% to about 50%, more preferably from about 0.01% to about 10%, based on the weight of the support material 44. The most preferred combination of photocatalyst 42 and support material 44 is an amount of about 1 weight % (based on the weight of the support material) of 1 weight % platanized anatase $TiO_2$ supported on 35–60 mesh Davisil™ silica gel. Most preferably, the photocatalyst 42 is affixed to the support material 44 according to the method set forth in detail below.

Figure 19:
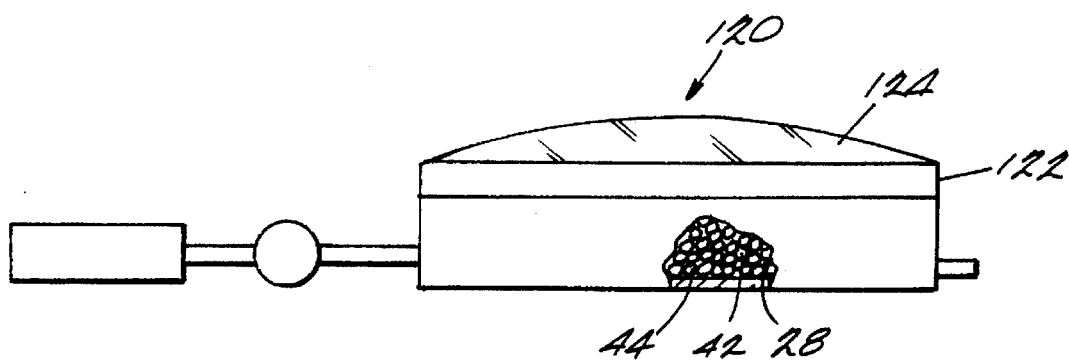
FIG. 19 is a side elevational view of a first alternative embodiment of an apparatus of the invention for destroying organic contaminants in fluid by solar-driven photocatalytic oxidation.

Illustrated in FIG. 19 is a first alternative embodiment of the invention. Except as described below, the apparatus 120 is similar to the apparatus 20, and common reference numbers identify similar elements. The apparatus 120 includes a reactor which is a shallow tank 122 including a cover 124 constructed of UV transmissive material 50. The photocatalyst 42 supported on particulate support material 44 is contained in the treatment zone 28 of the tank 122.

Figure 3:
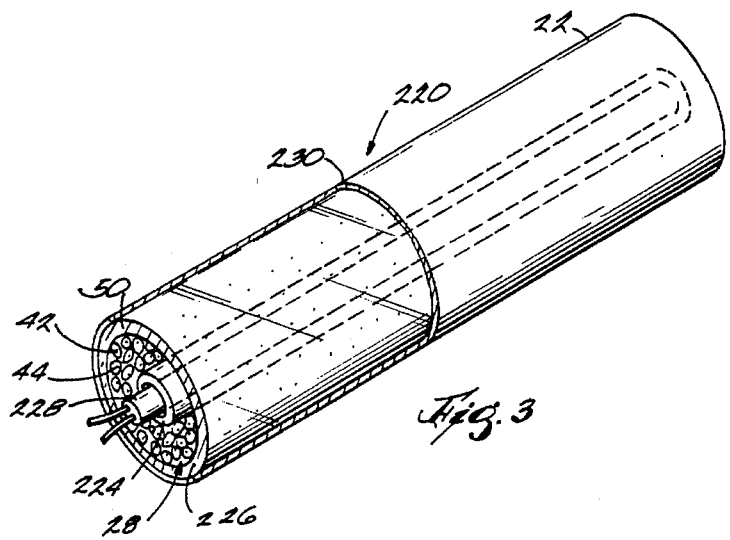
FIG. 3 is a perspective view of a second embodiment of an apparatus for destroying organic contaminants in fluid by artificial light-driven photocatalytic oxidation.

Illustrated in FIG. 3 is a second alternative embodiment of the invention illustrated in FIG. 3. Except as described below, the apparatus 220 is similar to the apparatus 20, and common reference numbers identify similar elements. The apparatus 220 includes a reactor 22. The reactor 22 includes concentric inner and outer tubular members 224 and 226 defining therebetween an annular treatment zone 28 having the photocatalyst 42 and support material 44 therein. The apparatus 220 also includes an artificial source of UV radiation to drive the photocatalytic oxidation processes. In the illustrated embodiment, the artificial UV source is a fluorescent lamp 228 at the center of the inner tubular member 224. The inner tubular member 224 is constructed of UV transmissive material 50 to transmit UV radiation generated by the fluorescent lamp 228 into the treatment zone 28. The outer tubular member 226 is constructed of UV transmissive material 50 and is surrounded by a UV reflective material 230, so that UV radiation passing outwardly through the outer tubular member 226 is reflected inwardly by the reflective material 230 back into the treatment zone 28. The distance between the fluorescent lamp 228 and the inner tubular member 224 may range from less than one millimeter to a meter or more, and preferably is about 15 centimeters. The distance between the inner and outer tubular members 224 and 226 (the width of the annular treatment zone 28) may range from less than 1 millimeter to a meter or more, and preferably is about 1 centimeter. In an alternate arrangement (not shown), the reactor 22 is cylindrical, and instead of an inner tubular member 224, the fluorescent lamp 228 directly contacts the photocatalyst 42 and support material 44 and thereby cooperates with the outer tubular member 226 to define the annular treatment zone 28. In another alternative arrangement (not shown), the reactor 22 may include reflective material 230 covering only a portion of the outer tubular member 226, so that the apparatus 220 is usable with a combination of external sunlight, external artificial light and an internal fluorescent lamp 228.

The invention also provides a method for preparing a supported photocatalyst. In a first step, an aqueous slurry of photocatalyst particles is admixed with a particulate support material for a period sufficient to coat the outer surface of the support material with a desired amount of the photocatalyst. Next, the coated support material is dried. Finally, the dried, coated support material is calcined. Preferably, as described above, the support material is a material transmissive of UV radiation.

If required, the surface of the support material can be roughened by chemical or mechanical treatment to improve retention of the photocatalyst on the surface. For example, the surface of glass beads and glass wool must be roughened prior to contacting with the photocatalyst, such as by basic etching with 10 weight % NaOH. Preferably the photocatalyst slurry is prepared by adding a desired amount of the photocatalyst to deionized water, ultrasonically dismembering the slurry and diluting the slurry to a desired concentration. For example, to make 200 g of silica-gel supported photocatalyst with 1 weight % photocatalyst loading, the slurry can be made by adding 2 g of the photocatalyst 42 to 200 ml of deionized water, and then mixing the slurry with the support material. Preferably, the coated support material is dried in air at about ambient temperature. Also, the dried, coated support material preferably is calcined in air at a temperature of in the range of about 250° C. to about 1000° C., more preferably about 600° C., for a period preferably in the range of about 1 hour to about 72 hours, and more preferably about 24 hours.

The invention also provides a method for preparing a photocatalyst supported on adsorbent support material. In a first step, a solution comprising about 80% by volume of titanium isopropoxide (TIP) (Aldrich Chemical Co., Milwaukee, Wis.) is admixed with an adsorbent support material. This mixture is mixed for a period sufficient to coat the support material with a desired amount of TIP, and the coated support material is placed in a humid environment for a period sufficient to hydrolyze the TIP onto the support material. The resulting $TiO_2$/support material is then dried and calcined. For example, the admixed TIP/support material can be periodically agitated or mixed during a period of about 24 hours, and the coated support material placed in a humid environment for about 48 hours to hydrolyze the TIP onto the support material. The resulting $TiO_2$/support material can be dried at about 70° C. for about two hours and then calcined at about 500° C. for about 3 hours under vacuum. The calcined $TiO_2$/support material can be washed with deionized water to remove excess $TiO_2$ and then dried, such as, for example, at about 70° C. for about two hours. In a second step, an aqueous slurry of 1% Pt-$TiO_2$ photocatalyst is prepared, and the $TiO_2$/support material from the first step is immersed in the Pt-$TiO_2$ slurry for a period to coat the $TiO_2$/support material with Pt-$TiO_2$. The resulting Pt-$TiO_2$/$TiO_2$/support material is dried, and then rinsed and dried again. For example, a 3 weight % aqueous slurry of 1% Pt-$TiO_2$ photocatalyst is prepared, and the $TiO_2$/support material is immersed in the Pt-$TiO_2$ slurry for a period of about 10 minutes. The resulting Pt-$TiO_2$/$TiO_2$/support material is dried at about 70° C. for a period of about 2 hours. The dried Pt-$TiO_2$/$TiO_2$/support material is then washed with deionized water and dried at about 105° C. for a period of about 12 hours.

The invention also provides a method for preparation of a Pt-$TiO_2$ photocatalyst adapted for the destruction of organic contaminants in fluid. The photocatalyst is particularly effective for destroying disinfectant by-product precursors. In a first step, $TiO_2$ powder is calcined. Preferably, the $TiO_2$ is synthesized by a sol-gel process, more preferably the low temperature sol-gel process (Yan and Rhodes, 1983). Preferably the $TiO_2$ powder is calcined in air at a temperature ranging from about 250° C. to about 600° C., more preferably about 350° C., for a period ranging from about 1 hour to about 72 hours, more preferably about 24 hours. In a second step, the surface of the $TiO_2$ powder is modified with Pt. The amount of Pt is about 0.01 to about 10% by weight, preferably about 1% by weight, based on the weight of the $TiO_2$. Preferably, the Pt is photo-reduced onto the surface of the $TiO_2$ from hexachloroplatanic acid according to Bard et al. [1981].

The invention also provides a method for the destruction of organic contaminants in a fluid. In a first step, the fluid to be treated is introduced into the treatment zone of a reactor having therein a photocatalyst affixed to a support material. While the fluid is in contact with the photocatalyst, the fluid and photocatalyst are exposed to ultraviolet radiation for a period sufficient to destroy a desired amount of the organic contaminants in the fluid. Preferably, as described above, the reactor is constructed of UV transmissive material for admitting UV radiation into the treatment zone. Also, preferably the UV radiation is provided by reflection of sunlight from a reflector panel exterior of the reactor. In some arrangements, the UV radiation can be provided by an artificial light source.

The above-described method can be practiced with different modifications, or operational modes, depending upon the fluid and organic contaminants being treated, the light source, and the support material, among other factors. One operational mode involves continuous operation wherein the reactor is always exposed to UV radiation, either solar radiation or an artificial light source. In this mode, the organic contaminants are oxidized as the fluid passes through the reactor. If sunlight is utilized as the source of UV radiation in this mode, a supplemental light source is required during night-time operation. Storage tanks may be used to overcome this operational problem.

A second operational mode for the above-described method also involves continuous operation, however the reactor is only periodically exposed to UV radiation. This mode is used when the photocatalyst is supported by an adsorbent support material. Preferably, the adsorbent-supported photocatalyst is prepared according to the method described above. Adsorption onto the support material removes the organic contaminants from the water during periods of nonexposure. The adsorbed organic contaminants are oxidized to regenerate the adsorbent support material when the reactor is exposed to UV radiation. This modification is useful for solar applications, because adsorption of organic contaminants onto the support material continues to remove the organic contaminants during the night or extended periods of low light intensity. During periods of sunlight, the adsorbed organic contaminants are oxidized, and the adsorbent support material is regenerated. Once the adsorbent support material is regenerated, it is again rendered capable of adsorbing organic contaminants during periods of darkness or low light intensity. An apparatus (not shown) adapted for this operational mode includes reactors containing photocatalyst fixed on silica-gel support material, and connected in series with reactors containing photocatalyst fixed on adsorbent support material to enable continuous operation through alternating periods of UV exposure and nonexposure.

A third operational mode is a combination of the first and second operational modes described above. This mode involves continuous operation using an adsorbent support material, wherein the reactor is exposed to UV radiation only periodically. The adsorbent support material removes the organic contaminants from the fluid during periods of nonexposure. The adsorbent support material is then regenerated by backflushing with hot water or steam and/or exposing the adsorbent support material to UV radiation. The organic contaminants and by-products of partial oxidation transferred to the regeneration water during backflushing are oxidized by treatment in another reactor operated in the first mode described above.

A fourth modification of the above-described method includes using an adsorbent support material and operating the reactor without exposure to UV radiation until the organic contaminants are no longer adsorbed and begin to pass through the bed of photocatalyst and support material. Then, the reactor is taken off-line and the adsorbent support material is regenerated by backflushing with hot water or steam, and/or exposing the adsorbent support material to UV radiation. The organic contaminants and/or by-products of partial oxidation which are contained in the regeneration fluid are oxidized using a reactor operated in the first mode described above.

The above-described method can also be practiced including a pretreatment step. In the pretreatment step, a filter, an oxygen saturator, and an ion-exchange unit are utilized. The filter, preferably a 0.35 micron filter, is used to remove particulate matter in the fluid stream to prevent clogging the photocatalyst and support material and fouling or coating the surface of the photocatalyst. The oxygen saturator is used because the fluid being treated, such as groundwater or highly contaminated wastewater, may not contain enough dissolved oxygen to oxidize the organic contaminants. The dissolved oxygen may be added using air or pure oxygen mixed under pressure, preferably at about 15–75 psi, and the mixing vessel should be sealed to prevent the loss of volatile organic contaminants. The ion exchange unit can be used for removing species, such as metal cations and inorganic anions, which foul the photocatalyst and interfere with the destruction of organic contaminants in other ways. For this purpose, other suitable and less expensive technologies, such as metal oxidation, coagulation and filtration may be used, especially for larger scale applications. For extremely strong waste streams, other oxidants, such as hydrogen peroxide ($H_2O_2$) and/or ozone ($O_3$) may be added.

Also according to the invention, the previously described apparatus, methods for photocatalytic oxidation, supported photocatalysts, photocatalysts, and methods for making supported photocatalysts and photocatalysts are particularly useful for the photocatalytic oxidation of disinfectant by-product precursors (DBP precursors) in drinking water sources and supplies. Disinfection by-products are formed when drinking water sources are disinfected, such as by chlorination. When a disinfectant such as chlorine is added to source water, it reacts with a portion of the background organic matter (BOM) present in the source water to produce disinfection by-products. The reactive portions of the BOM are referred to as disinfection by-product precursors (DBP precursors). As described above, the source of UV radiation may be artificial light or sunlight. A nonexhaustive listing of disinfection by-products which can be degraded according to the invention is provided in Table 2. Disinfection by-products and DBP precursors not listed in Table 2 can also be degraded according to the invention.

Table 2

Disinfection By-Product Precursors Degraded According to the Invention chloroform ($CHCl_3$)
1,1,1-trichloroethane (TCA)
carbon tetrachloride ($CCl_4$)
trichloroacetonitrile (TCAN)
trichloroethelene (TCE)
chlorodibromomethane ($CHBrCl_2$)
dichloroacetonitrile (DCAN)
bromodichloromethane ($CHBr_2Cl$)
dibromoethane ($CH_2Br_2$)
tetrachloroethene (PCE)
bromoform ($Br_3CH$)
dibromoacetonitrile (DBAN)
monochloroacetic acid (MCAA)
monobromoacetic acid (MBAA)
dichloroacetic acid (DCAA)
trichloroacetic acid (TCAA)

The amount of photocatalyst required for best DBP precursor destruction depends upon the type of photocatalyst employed, and whether or not the photocatalyst is immersed in slurry form or fixed on a support material. When the photocatalyst is loosely immersed in slurry form, the photocatalyst dosage may range from about 0.01% to about 5% by weight, based on the weight of water being treated. When the photocatalyst is fixed on support material, the dosage may range from about 0.01% to about 10% by weight, based on the weight of support material.

A method of DBP precursor destruction according to the invention may be incorporated at any point before, during or after any of the stages involved in the treatment of drinking water supplies. The drinking water sources can be raw surface and ground waters, and surface and ground waters that have been treated by conventional water treatment processes such as coagulation, flocculation, sedimentation, and filtration. Since most drinking water sources contain different types and amounts of background organic matter (BOM), the DBP precursor destruction rate will vary for different waters. The destruction of DBP precursors may be determined by measuring the removal of nonpurgeable organic carbon (NPOC) and, total organic carbon (TOC), or trihalomethane formation potential (THMFP) and disinfection by-product formation potentials (DBPFP). Methods for these measurements are found in Standard Methods for the Examination of Water and Wastewater (18th Edition) and in USEPA method 552.

The destruction of DBP precursors can be accomplished in different reactor configurations, including continuous stirred batch reactor (CSTR) processes and plug flow reactor (PFR) processes. In the CSTR process mode, the photocatalyst powder may be added directly to the water, mixed, and exposed to a source of UV radiation for a period of time sufficient to achieve a desired DBP precursor destruction. The photocatalyst and water may then be separated, producing water containing DBP precursor levels which, when exposed to disinfectants, will produce insignificant DBP concentrations. In the PFR process mode, the photocatalyst may be fixed on a support material or added loosely to form a slurry. Single or multiple passes by the water over the UV illuminated photocatalyst, or by the slurry through a UV illuminated zone, can be used to achieve a desired treatment objective. Any of the described methods for DBP precursor destruction can be incorporated into different reactor configurations and applied to modes of operation other than those described herein.

The following examples are intended to illustrate the utility of the above-described invention, and are not to be construed as limiting the subject matter of the claims.

EXAMPLES

Examples 1–13 relate to the destruction of organic contaminants in fluid, which in the Examples is water. Examples 14–17 relate to the destruction of DBP precursors in drinking water.

In the various examples, the following analytical apparatus and methods were used. The concentration of trichloroethylene (TCE) and tetrachloroethylene (PCE) were analyzed by direct aqueous injection (Supelco GC Bulletin 816A, Supelco, Inc., Houston, Tex.) using a Hewlett Packard 5880A gas chromatograph (GC) (Hewlett Packard (HP), Palo Alto, Calif.) equipped with an electron capture detector. BTEX compounds (benzene, toluene, ethyl benzene and xylenes) were analyzed with purge and trap apparatus according to EPA Method 8020 using a Hewlett Packard 5890 Series II gas chromatograph (HP; Palo Alto, Calif.). The GC was equipped with a Dynatech PTA-30 auto sampler (Dynatech, Baton Rouge, La.) and an OIC Corporation 4460A sampler concentrator (OIC Corporation, College Station, Tex.). The chloride ion concentration was measured using a Dionex Model 12 ion chromatograph (IC) (Dionex, Sunnyvale, Calif.). The concentrations of total organic carbon (TOC), dissolved organic carbon (DOC), and nonpurgeable organic carbon (NPOC) were measured following Standard Method number 5310-C, using a Dorhman DC-180 organic carbon analyzer (Dorhman, Santa Clara, Calif.). THMFP tests were conducted according to Standard Methods procedure 5710-B. The analyses for additional DBPs were conducted according to EPA method 552. Dissolved oxygen (DO) was analyzed using a YSI Model 54A oxygen meter (YSI, Yellow Springs, Ohio), and pH was determined using an Orion Model 501 digital ion analyzer (Orion, Cambridge, Mass.). An EG&G Gamma Scientific Model GS 3100 spectroradiometer (EG&G Gamma Scientific, San Diego, Calif.) was used to measure sunlight intensity and also to determine the light transmission of various support materials. The spectroradiometer included a probe connected by a fiber optic cable, and was calibrated with an EG&G Gamma Scientific Model GS-5150 Deuterium Lamp (EG&G Gamma Scientific, San Diego, Calif.). Deionized water was distilled and further purified using a Milli-Q purification system (Millipore Corp., Bedford, Mass.) and filtered through a 1.0 meter long activated carbon column and 0.45 micron filter. The Milli-Q water was saturated with dissolved oxygen from air, and the initial pH value was about 6.5.

Destruction of Organic Contaminants in Water

In Examples 1–13, relating to the destruction of organic contaminants in water, 1 weight % Pt-$TiO_2$ was prepared by photoreducing Pt from hydrogen hexachloroplatinate (IV) hydrate (99.995%, Aldrich Chemical Co., Milwaukee, Wis.) onto the surface of $TiO_2$ (99.9+% purity, Lot No. 00108TV, Aldrich Chemical Co., Milwaukee, Wis.), using a method similar to that described by Kraeutler and Bard (Kraeutler and Bard, 1981).

EXAMPLE 1

Figure 4:
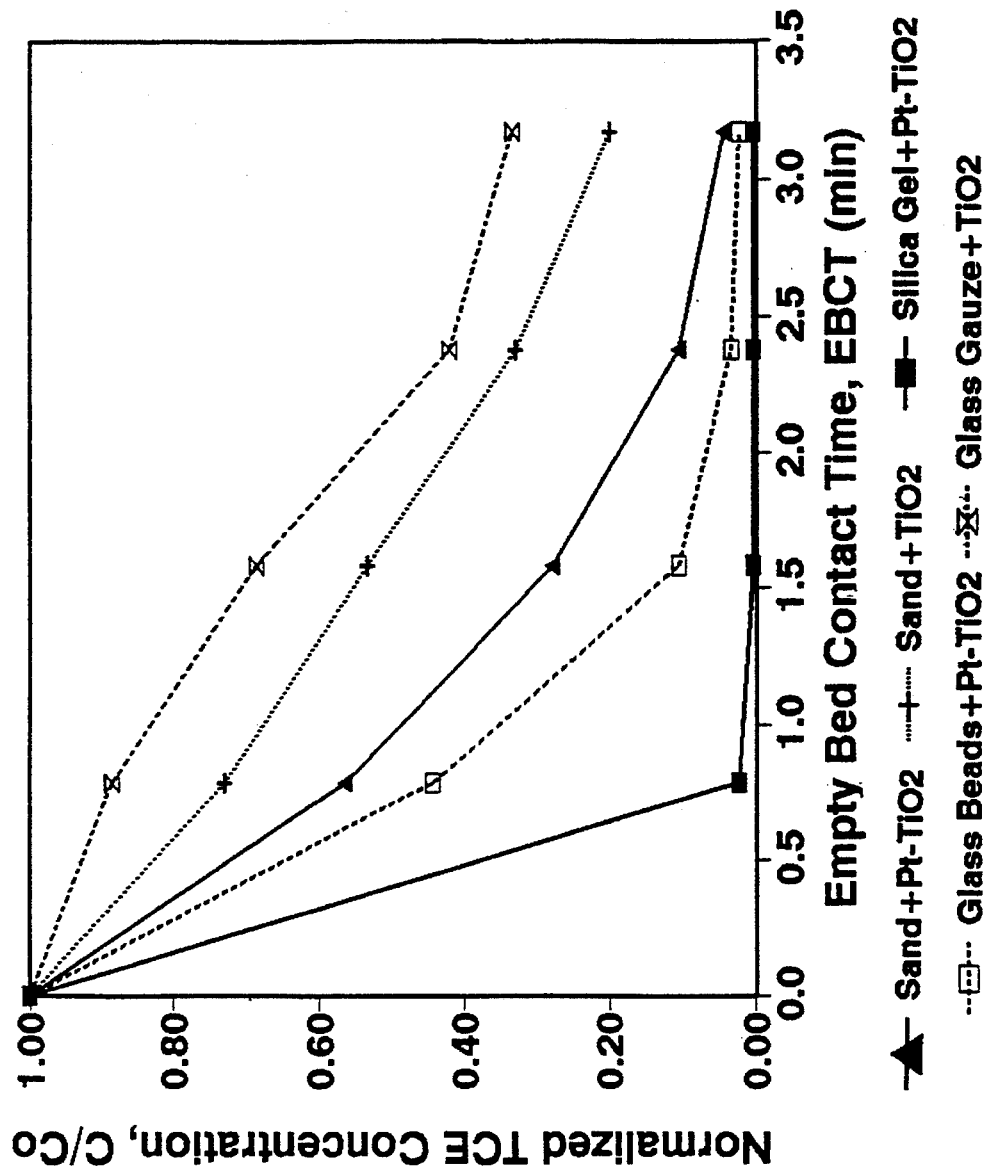
FIG. 4 is a plot of trichloroethylene (TCE) concentration as a function of empty bed contact time (EBCT) for five photocatalyst and support material combinations.
Figure 20:
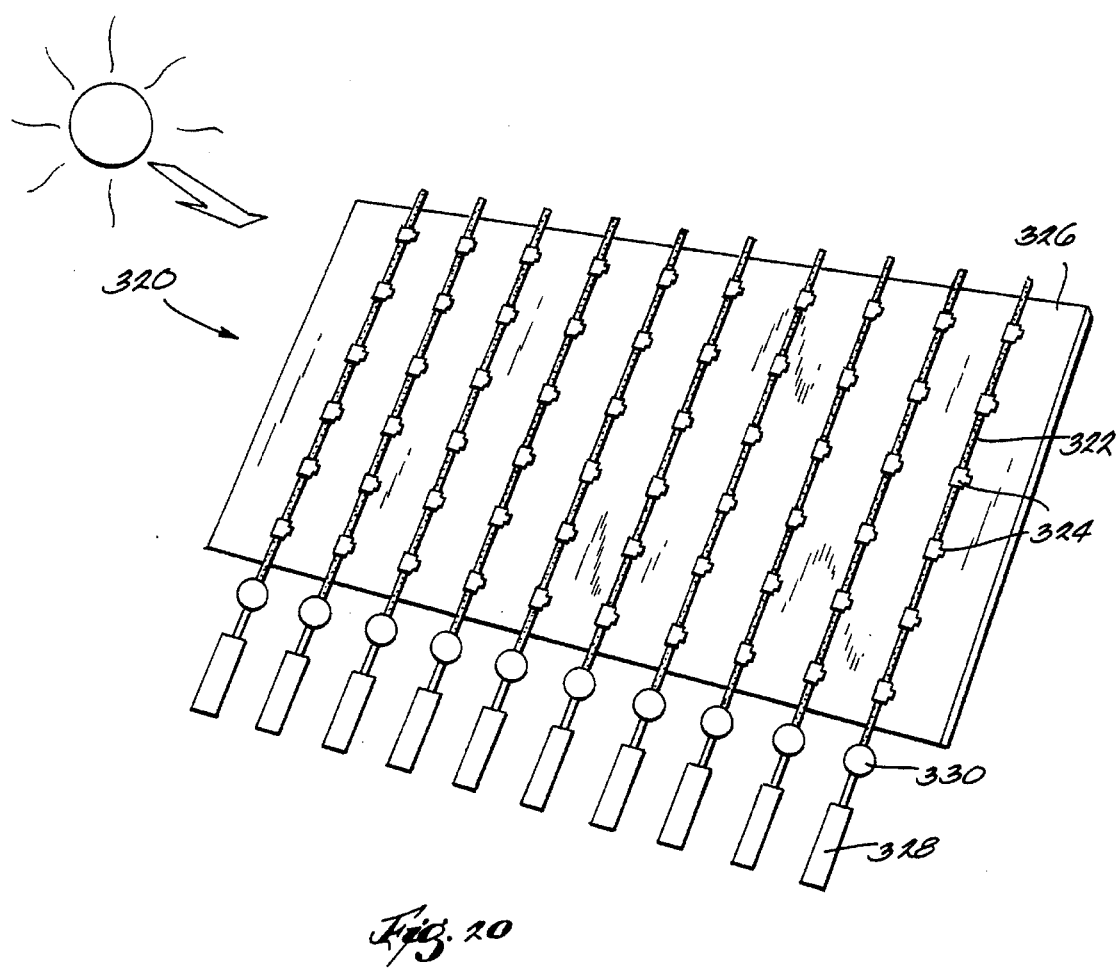
FIG. 20 is a schematic illustration of the experimental apparatus used in Example 1.

An apparatus of the invention was utilized with sunlight as the source of UV radiation to destroy TCE in water. The experimental apparatus 320, illustrated schematically in FIG. 20, included up to ten reactors 322 comprising 1.0 m long M-7® plastic tubes with inside diameters of ¼" and outside diameters of ⅜". Sections of each plastic tube were connected by five tees 324 providing sample ports along each reactor 322. The sample ports 324 enabled monitoring of influent concentration, and the concentration at 25, 50, 75 and 100 cm of reactor length. The reactors 322 were mounted in front of a flat plate metal reflector 326 which was angled at 45° toward the sun. The reactors 322 were packed with photocatalyst affixed to support material. Four support materials were compared: sand, glass beads, silica gel and glass gauze. Water contaminated with TCE was provided to the reactors 322 from water sources 328 by pumps 330. As shown in FIG. 4, the silica gel support material provided the highest TCE destruction. The normalized TCE (C/Co) represents the fractional degradation for the various reported empty bed contact times (EBCT).

EXAMPLE 2

Figure 5:
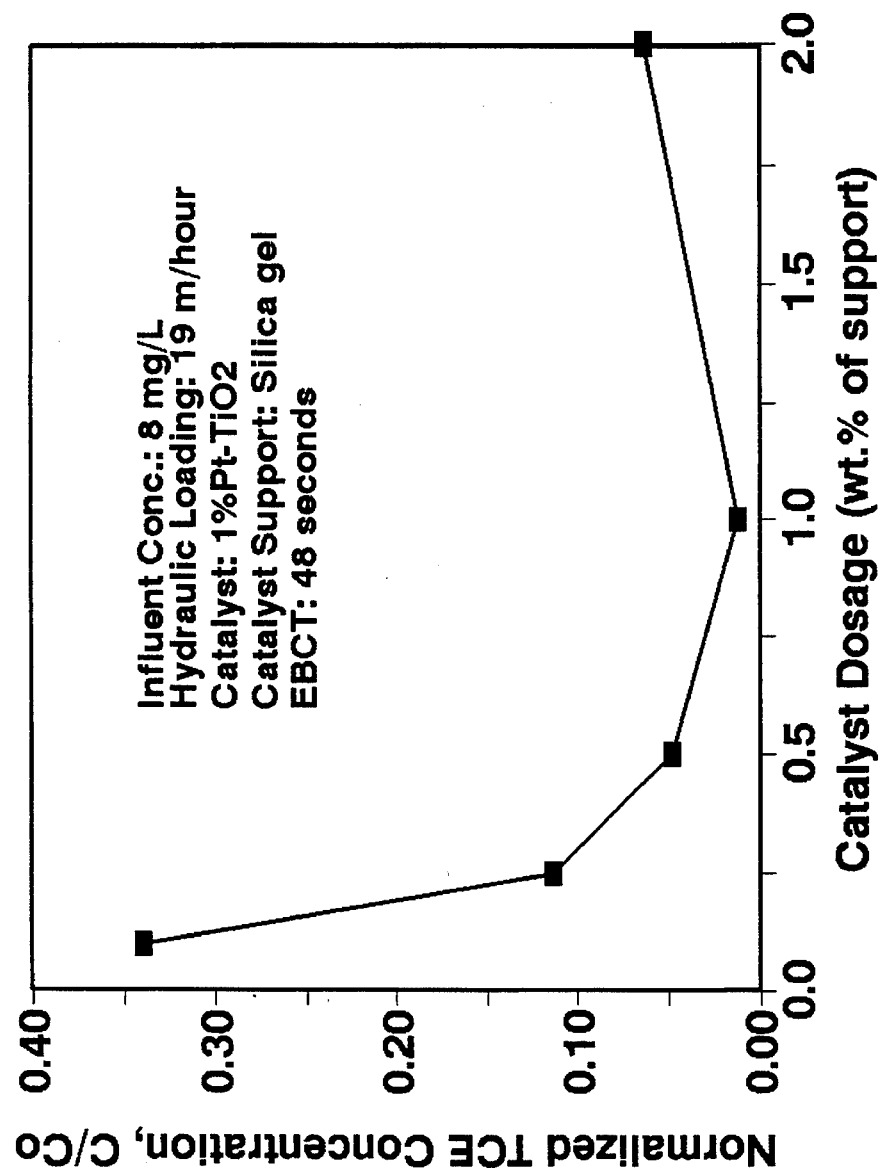
FIG. 5 is a plot of TCE concentration as a function of photocatalyst dosage for silica gel support material.

The apparatus described in Example 1 was utilized with sunlight as the source of UV radiation to destroy TCE in water. Photocatalyst loadings of 0.1, 0.25, 0.5, 1.0, 2.0, 4.0 and 8.0 weight %, based on the weight of support material, were compared for silica gel supports. FIG. 5 displays the TCE concentration at the first sample port in the reactor for various photocatalyst dosages. As shown in FIG. 5, 1.0 weight % of photocatalyst provided the greatest destruction for samples taken at the 25 cm port.

EXAMPLE 3

Figure 6:
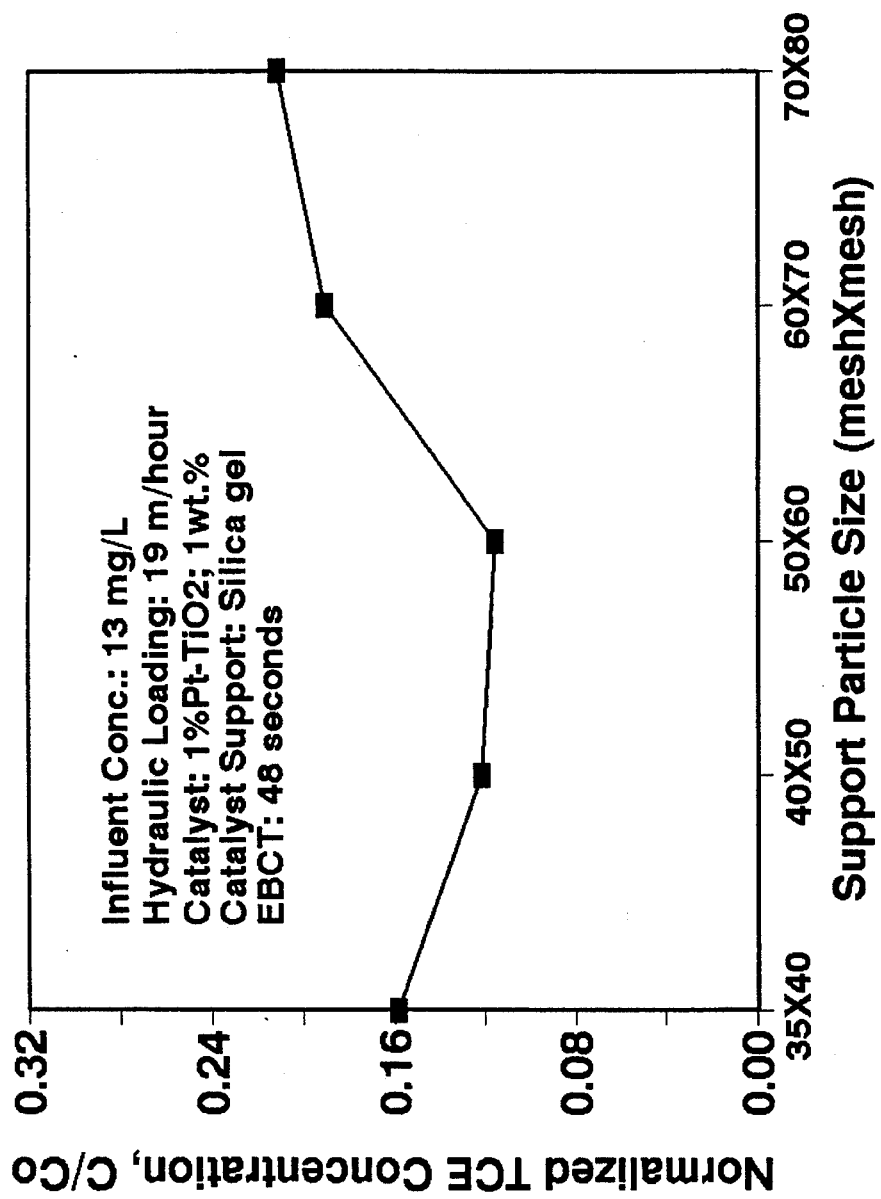
FIG. 6 is a plot of TCE concentration as a function of particle size for the indicated EBCT for silica gel support material in the same reactor.

The apparatus described for Example 1 was utilized with sunlight as the source of UV radiation to destroy TCE in water. Silica gel support material particle sizes of 35×40, 40×50, 50×60, 60×70 and 70×80 were evaluated. As shown in FIG. 6, the 50×60 mesh particles provided the greatest destruction. Particles in all sizes tested provided destruction greater than 80%.

EXAMPLE 4

Figure 7:
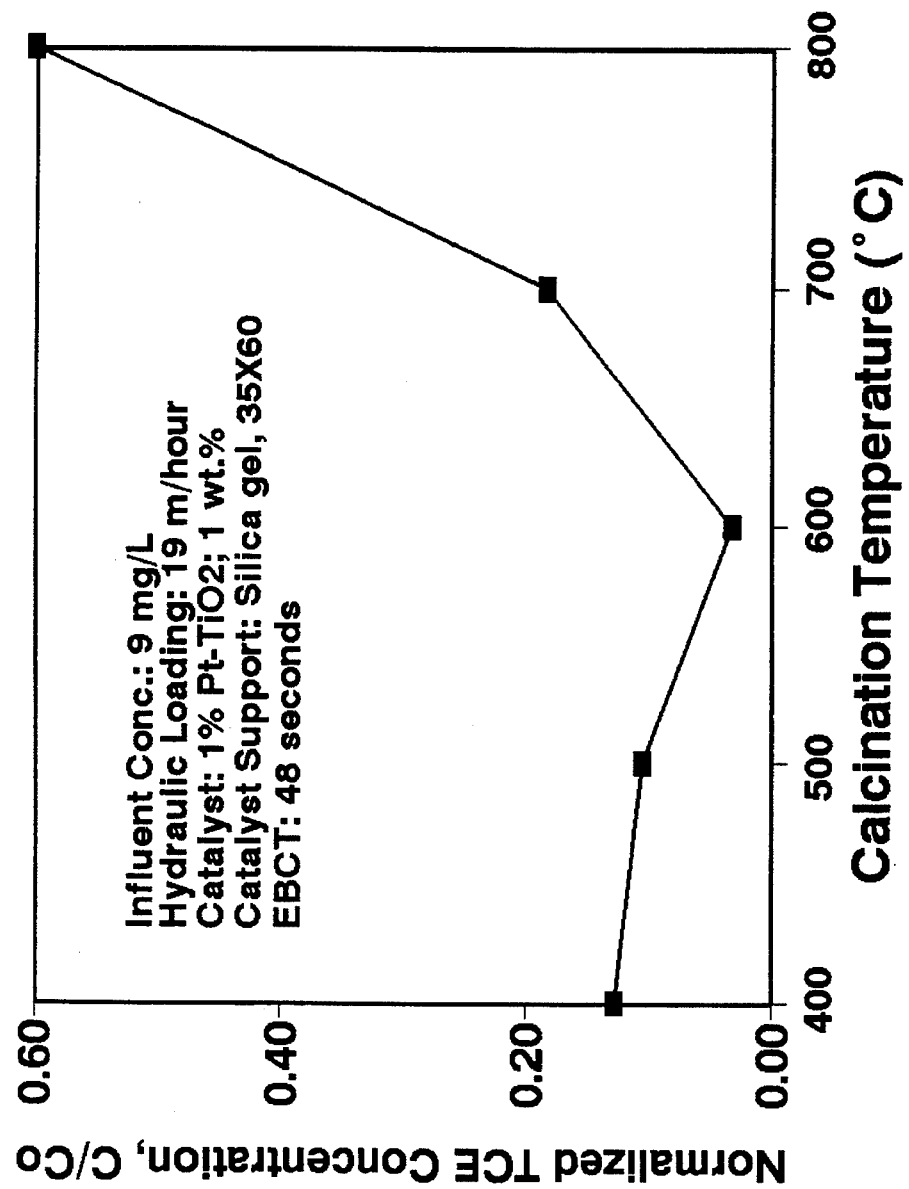
FIG. 7 is a plot of TCE concentration as a function of calcining temperature for the indicated EBCT for silica gel support material.

The apparatus described for Example 1 was utilized with sunlight as the source of UV radiation to destroy TCE in water. Calcining temperatures of 400°, 500°, 600°, 700° and 800° C. were compared for affixing the photocatalyst onto silica gel support material. As seen in FIG. 7, a calcining temperature of 600° C. provides the greatest TCE destruction. Similar tests for the sand support material showed that a calcining temperature of 500° C. provides highest destruction.

EXAMPLE 5

Figure 8:
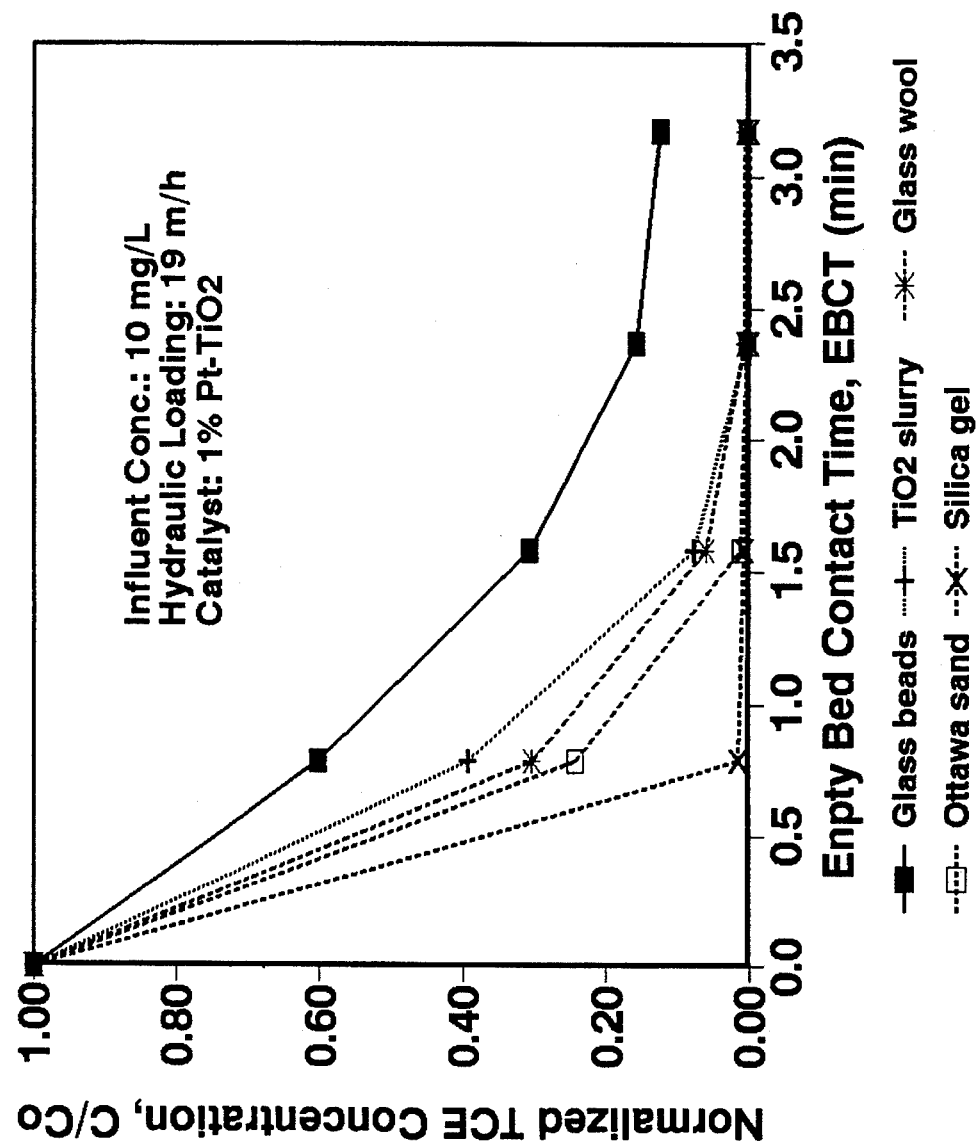
FIG. 8 is a plot of TCE concentration as a function of EBCT for four support materials and a photocatalyst slurry.

The apparatus described for Example 1 was utilized with sunlight as the source of UV radiation to destroy TCE in water. Silica gel, sand, glass beads and glass wool support materials were compared to an unsupported, loosely immersed $Pt-TiO_2$ slurry. The $Pt-TiO_2$ slurry was made by first making a concentrated slurry with a Dynatech Model 300 sonic dismemberator (Dynatech, Chantilly, Va.) and then diluting it to the required dosage. Different amounts of photocatalyst were present in the slurry and on the different support materials: 0.025 weight % $Pt-TiO_2$ in the slurry; 1 weight % on the sand, silica gel and glass bead support materials; and 10 weight % on the glass wool. As shown in FIG. 8, all combinations except the glass beads provided destruction below the detection limit of 0.5 µg/L after 3.2 minutes of EBCT, and the silica gel support material provided the fastest destruction.

EXAMPLE 6

Figure 9:
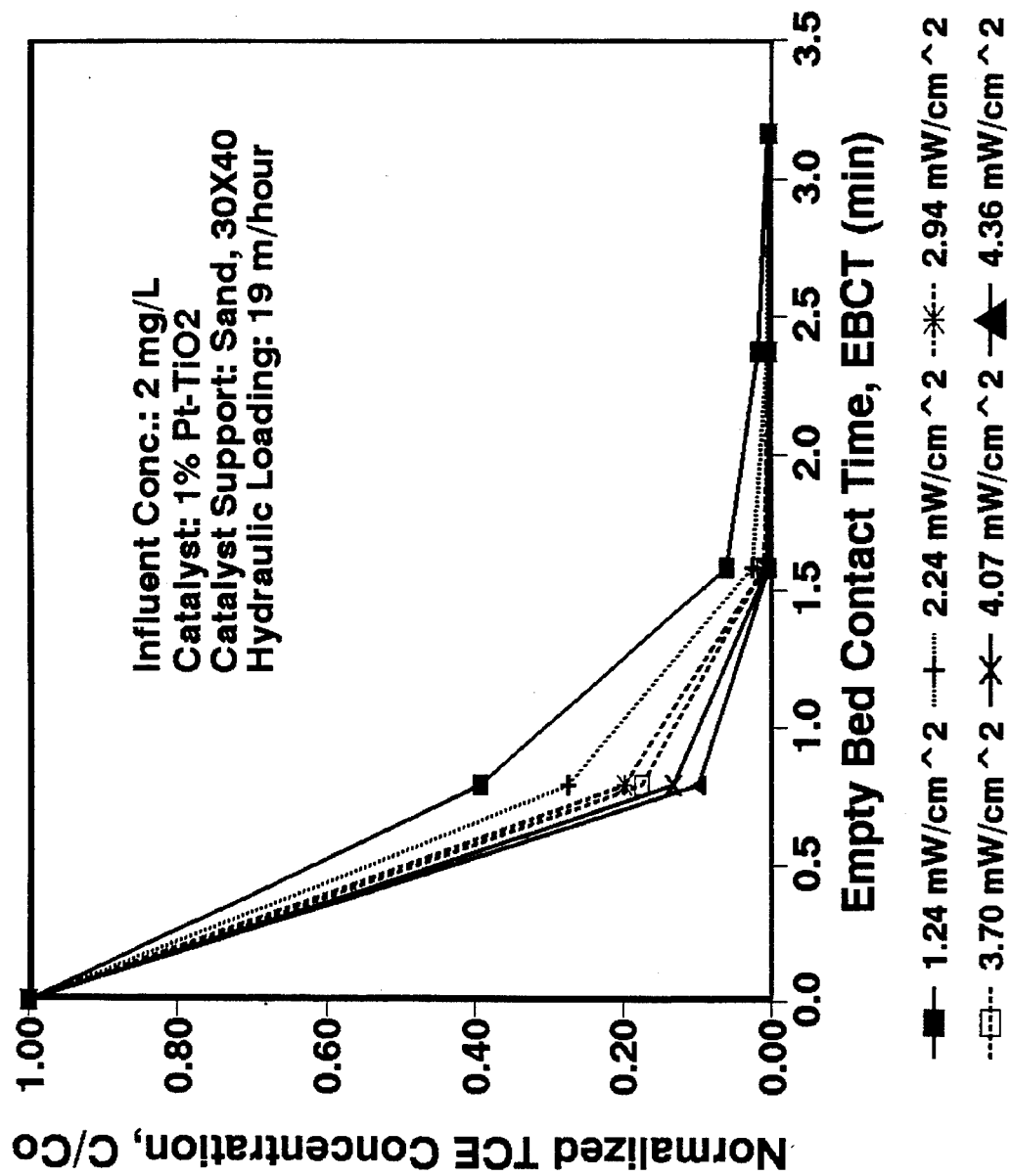
FIG. 9 is a plot of TCE concentration as a function of EBCT for exposures at six sunlight intensities with sand support material.
Figure 10:
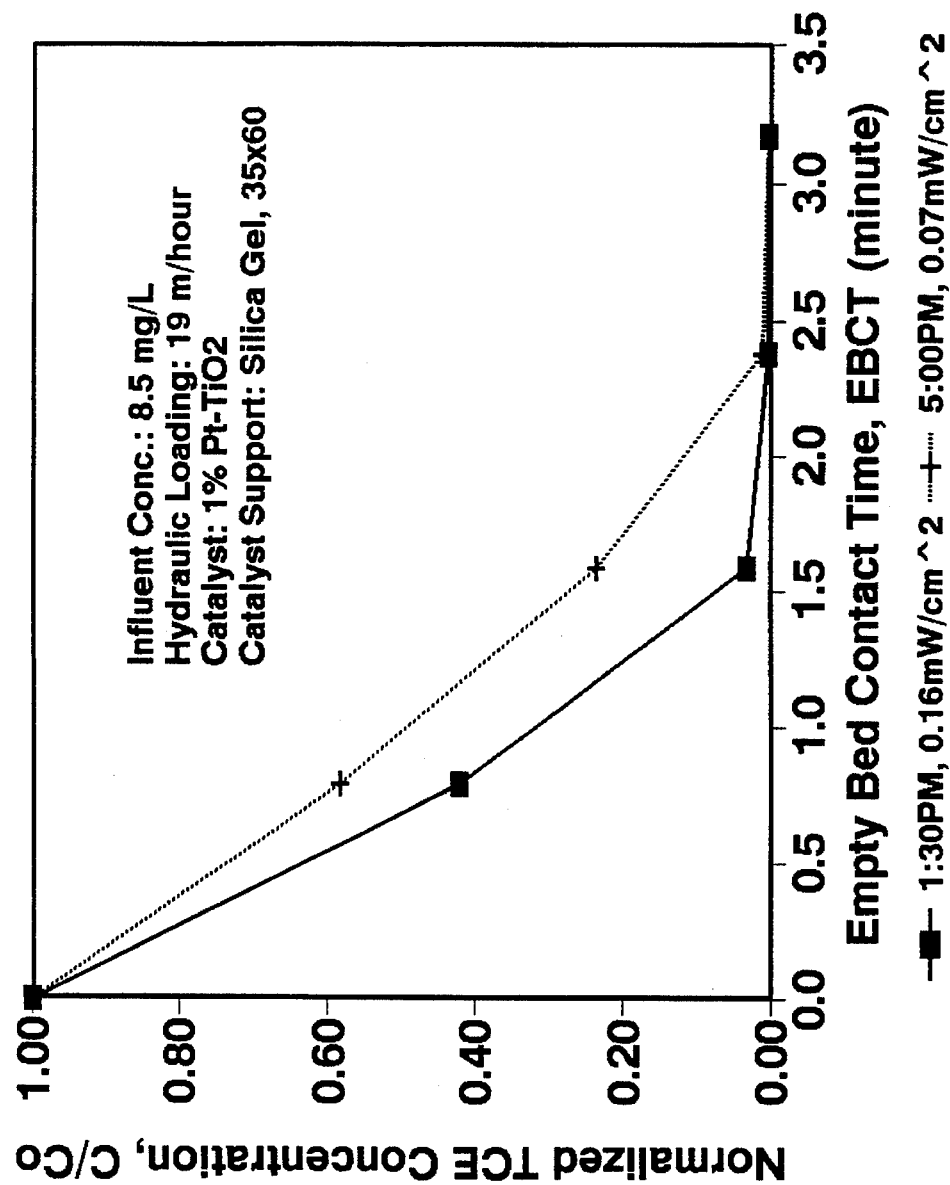
FIG. 10 is a plot of TCE concentration as a function of EBCT for exposures at two low sunlight intensities in rain with silica gel support material.

The apparatus described for Example 1 was utilized with sunlight as the source of UV radiation to destroy TCE in water. The destructive capacity of silica gel and sand support materials was compared for different incident sunlight intensities. As shown in FIGS. 9 and 10, silica gel support material exhibited the highest destruction and was effective even at low light intensities.

EXAMPLE 7

Figure 11:
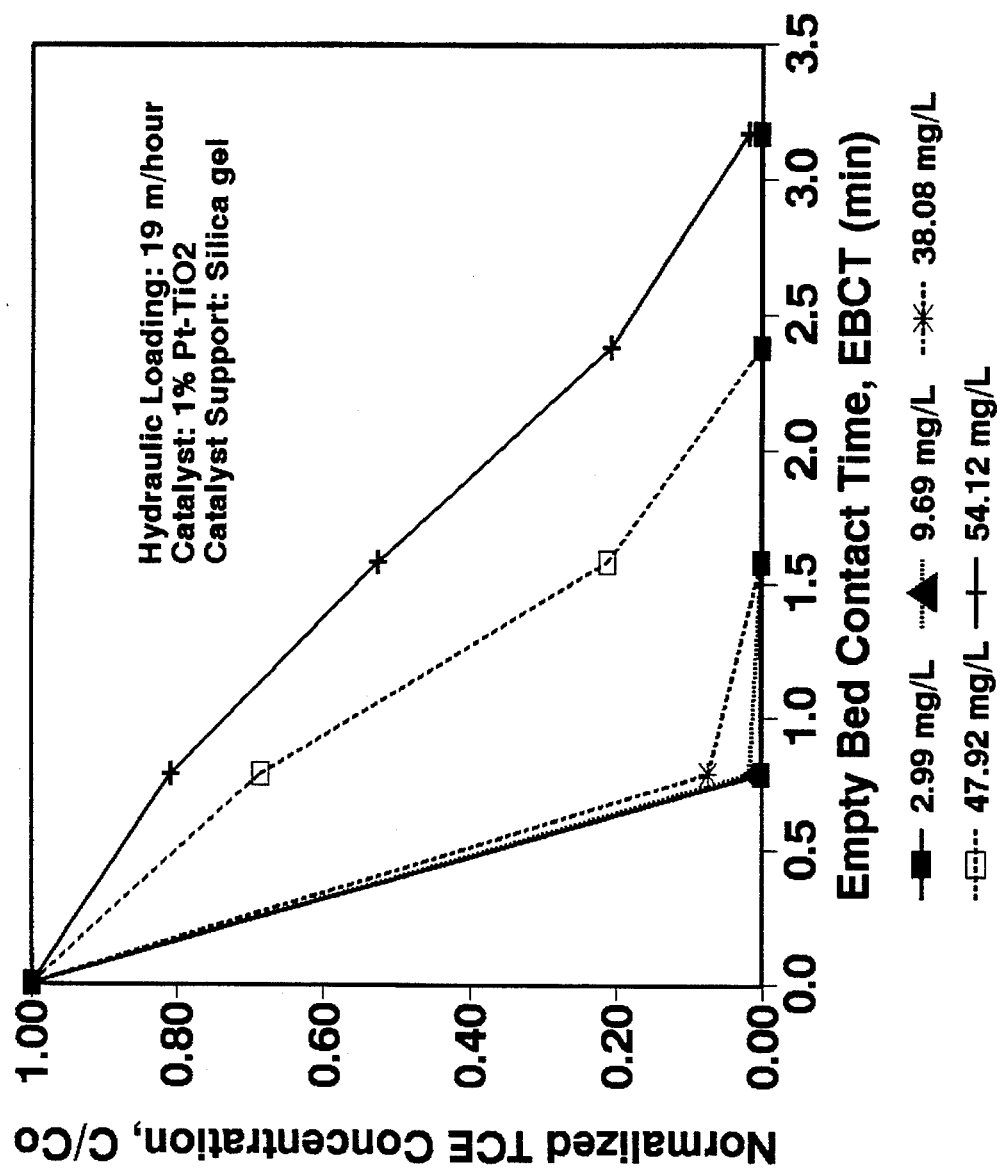
FIG. 11 is a plot of TCE concentration as a function of EBCT for five initial TCE concentrations using silica gel support material.

The apparatus described for Example 1 was utilized with sunlight as the source of UV radiation to destroy TCE in water. The performance of silica gel support material was compared for different initial TCE concentrations (2.99, 9.69, 38.08, 47.92 and 54.12 mg/L). As shown in FIG. 11, TCE destruction of more than 95% was obtained for all initial TCE concentrations in about three minutes of empty bed contact time (EBCT). More than 99.9% destruction was observed for influent concentrations less than 10 mg/L with 3.2 minutes of EBCT.

EXAMPLE 8

Figure 12:
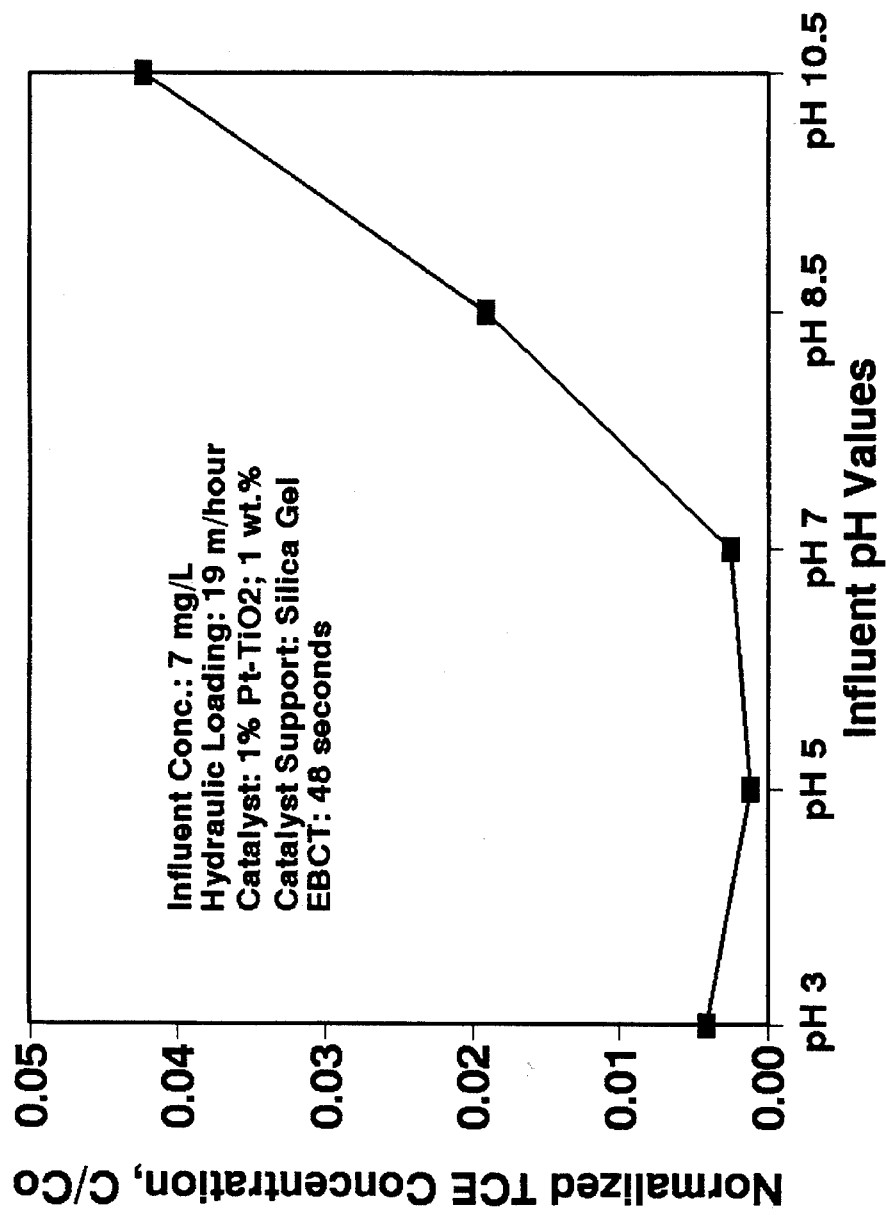
FIG. 12 is a plot of TCE concentration as a function of initial pH for silica gel support material.

The apparatus described for Example 1 was utilized with sunlight as the source of UV radiation to destroy TCE in water. The impact of initial pH on TCE destruction was studied with the silica gel support material and compared to a photocatalyst slurry prepared as described in Example 5. As shown in FIG. 12, destruction of TCE greater than 95% was obtained for pH values ranging from 3 to 7 with an EBCT of 48 seconds. Nearly 99.9% destruction was obtained than EBCT of 2.4 minutes even for a pH of 10.5 (not shown). In contrast, substantial impact of pH was found for a $Pt-TiO_2$ slurry (not shown). For example, at pH=3 (not shown), the $Pt-TiO_2$ in the slurry appeared to flocculate and very little TCE destruction was observed. This further demonstrates the destructive efficiency of photocatalytic oxidation using photocatalyst affixed to a support material according to the invention.

EXAMPLE 9

Figure 13:
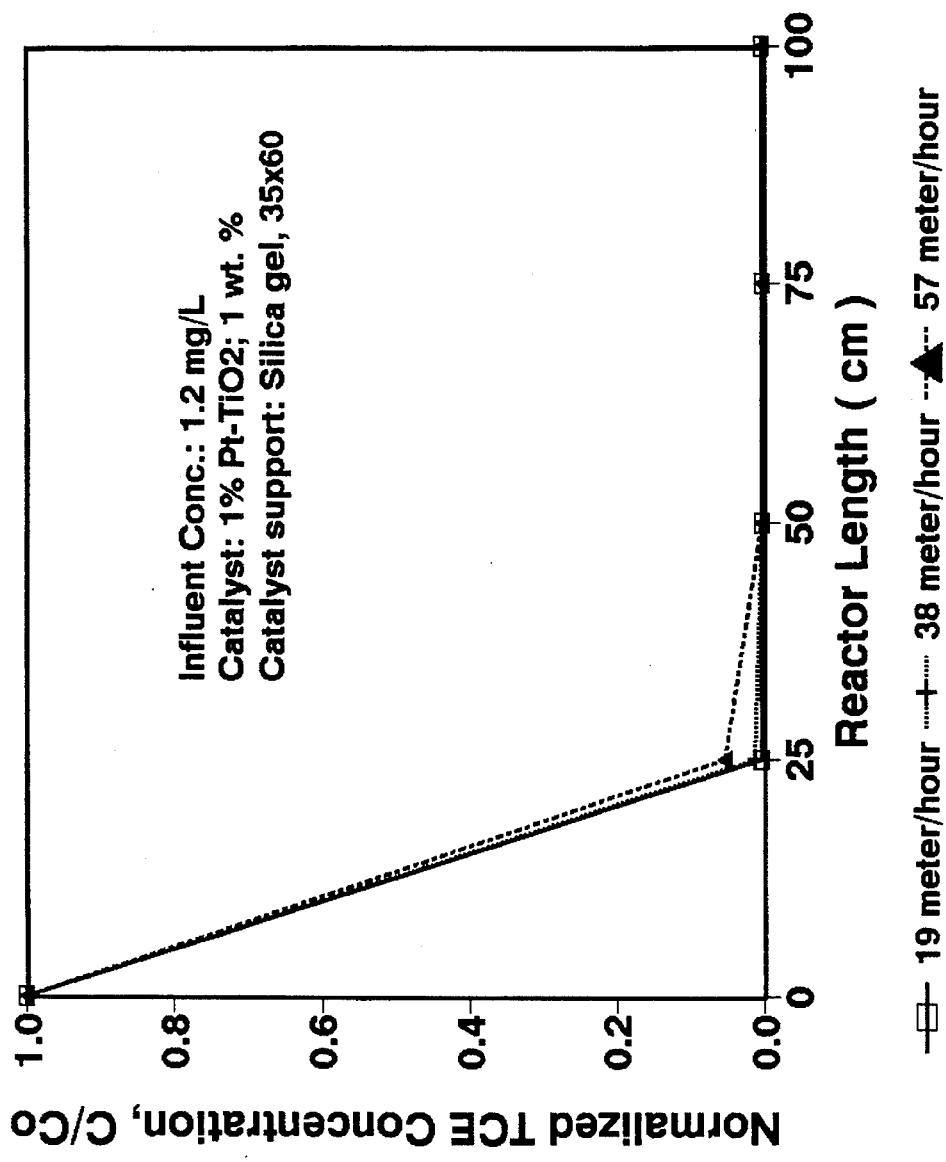
FIG. 13 is a plot of TCE concentration as a function of reactor length for three hydraulic loadings using silica gel support material.

The apparatus described for Example 1 was utilized with sunlight as the source of UV radiation to destroy TCE in water. Contaminated water was introduced at hydraulic loadings of 19, 38 and 57 meters/hour to photocatalyst supported on silica gel. As shown in FIG. 13, hydraulic loadings ranging between 19 and 57 meters/hour had little effect on TCE destruction, with TCE being destroyed more than 95% in 0.25 cm of reactor length for each hydraulic loading. Using a glass wool support (not shown), an influent concentration of 1.4 mg/L and hydraulic loading of 95 meters/hour, 99.9% of the influent TCE was destroyed in an EBCT of less than 30 seconds.

EXAMPLE 10

Figure 14:
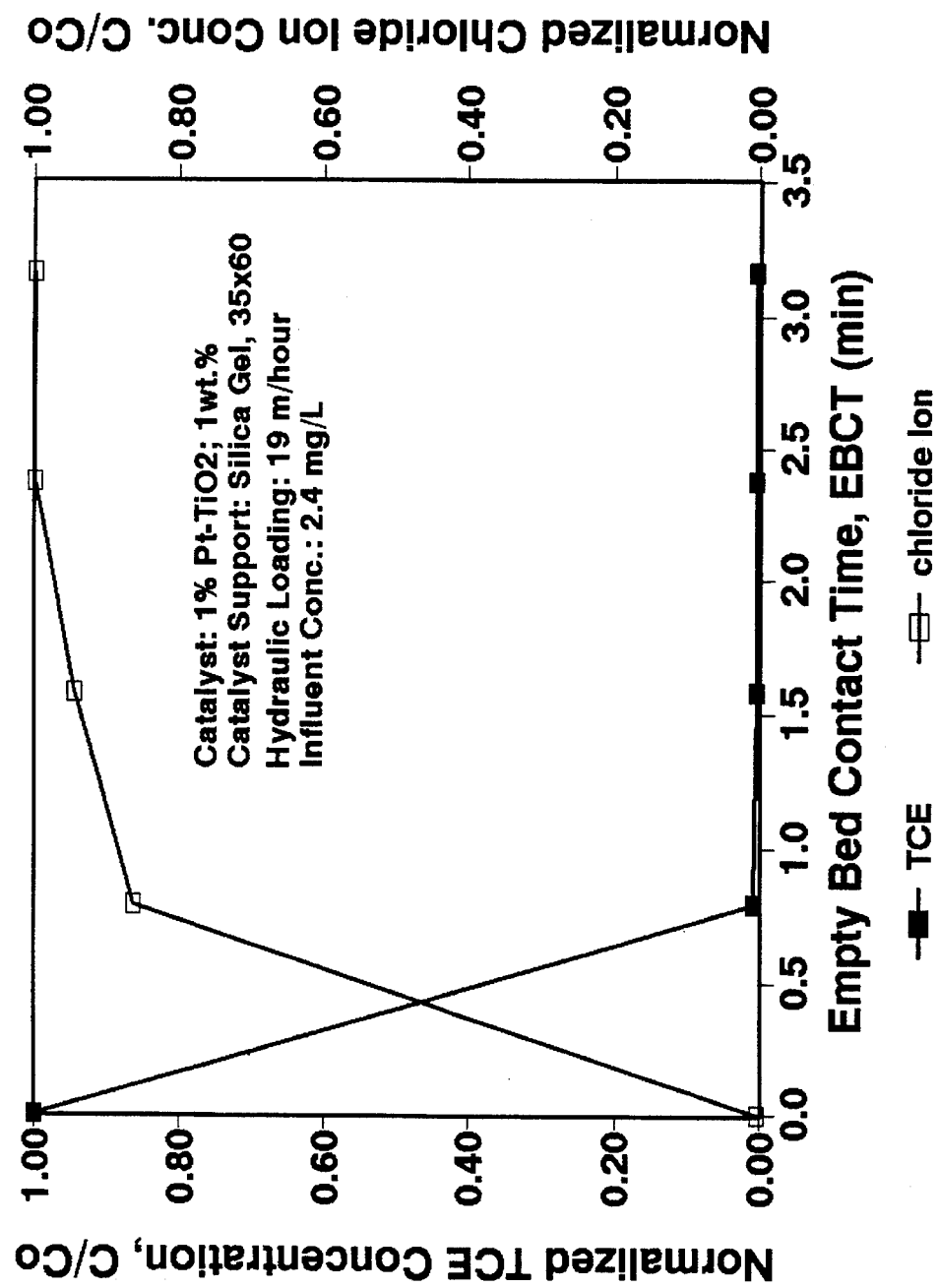
FIG. 14 is a plot of TCE concentration and chloride ion production as a function of EBCT using silica gel support material.

The apparatus described for Example 1 was utilized with sunlight as the source of UV radiation to destroy TCE in water. TCE destruction and chloride ion concentration were compared to that expected if the TCE were completely, rather than partially, destroyed. As shown in FIG. 14, although the chloride ion concentration lagged behind the TCE disappearance, all the chlorinated by-products were destroyed in 3.2 minutes of EBCT.

EXAMPLE 11

Figure 15:
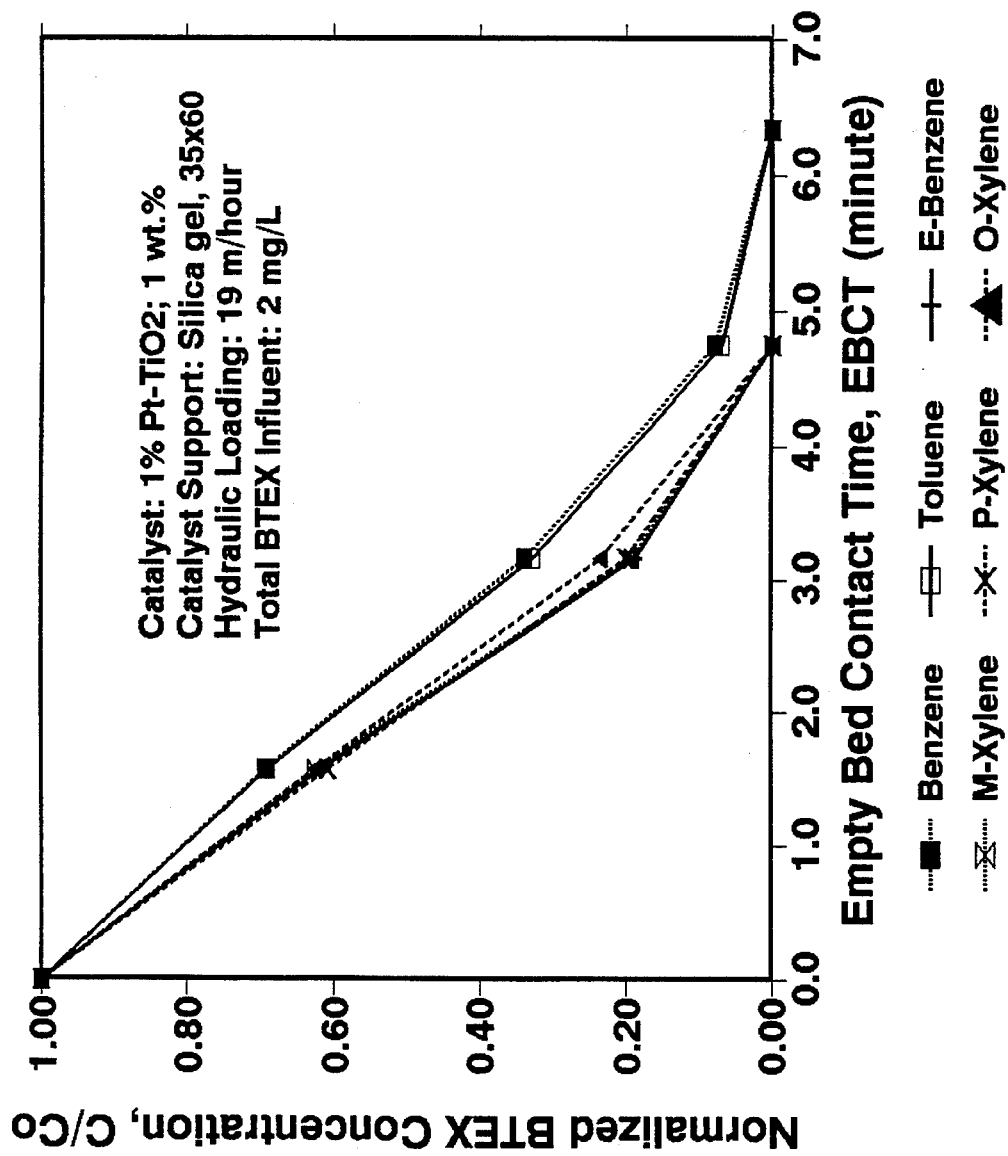
FIG. 15 is a plot of total BTEX (benzene, toluene, ethyl benzene and xylene) concentration as a function of EBCT using silica gel support material.

The apparatus described for Example 1, except using a 2 meter long reactor with an inside diameter of ½", was utilized with sunlight as the source of UV radiation to destroy benzene, toluene, ethyl benzene and xylenes (BTEX compounds) in groundwater as shown in Table 3. The photocatalyst was fixed on silica gel support material. As shown in FIG. 15, the BTEX compounds were destroyed from a combined concentration of more than 2 ppm to below the detection limit in an EBCT of less than 6.5 minutes on a rainy day.

TABLE 3

Typical Influent BTEX Compound Concentrations in Contaminated Water

| Organic Compound | Concentration (μ/l) | Percentage (%) |
|---|---|---|
| Benzene | 118 | 5 |
| Toluene | 813 | 36 |
| Ethylbenzene | 210 | 9 |
| o-Xylene | 214 | 10 |
| m-Xylene | 618 | 28 |
| p-Xylene | 277 | 12 |
| Total BTEX | 2250 | 100 |

In some tests (described below), water contaminated with BTEX compounds and also including particulate matter and various destruction-interfering and catalyst fouling species such as certain metal cations and inorganic anions was treated to determine the efffectiveness of a pretreatment apparatus preceding the reactor. The same reactor as above contained photocatalyst fixed on silica gel support material. The pretreatment apparatus included a 0.35 micrometer filter, a Tedllar™ bag for introducing dissolved oxygen into the water, and an ion exchange resin column including the resins specified below.

Organic and inorganic particulate matter can potentially clog the reactor bed and foul the photocatalyst by coating the photocatalyst surface. Therefore, the pretreatment apparatus included a 0.35 micrometer filter to remove turbidity from the water. The pretreatment apparatus also included apparatus for introducing dissolved oxygen into the water. Although other oxygen introduction apparatus could be used, in the tests a Tedllar™ bag was filled with water to be treated, and pure oxygen was introduced under pressure to establish a dissolved oxygen level of about 15 mg/L. Other oxidants such as hydrogen peroxide, potassium bromate, potassium peroxymonosulfate, and ammonium persulfate can also be used instead of oxygen.

In one test, the effectiveness of pretreatment was determined by comparison of identical reactors operated with and without pretreatment. A first reactor was fed contaminated water without pretreatment. A second reactor was fed with water pretreated by filtration, addition of dissolved oxygen, and ion exchange in an IRN 150 ion exchange resin column. The IRN 150 ion exchange resin (Rohm and Haas Co., Philadelphia, Pa.) was used to remove species believed to interfere with the photocatalytic process and foul the photocatalyst, and had a limited adsorption capacity for BTEX compounds. The IRN 150 resin was a mixture of IRN 77 anionic exchange resin and IRN 78 cationic exchange resin. With a total BTEX concentration of about 2 mg/L, the IRN 150 ion exchange resin column was saturated after 20 bed volumes were fed to the column. All data was collected after the resin column was saturated by BTEX compounds. The first reactor provided about 50% total BTEX destruction during one hour of operation, but destruction dropped to about 13% after two days of operation. The second reactor provided more than 95% destruction of BTEX compounds during operation about 8–9 hours a day for 25 consecutive days. No noticeable decrease in photoactivity was found throughout the 25 day test of the second reactor. The mixture of cationic and anionic ion exchange resins removed the species responsible for destruction interference and catalyst fouling. These species are possibly metal cations and common inorganic anions. Table 4 lists the concentrations of certain measured species in the contaminated water before and after ion exchange. Reduced cations may form metal layers on the catalyst surface and interfere with the electron transfer process. Bicarbonate, which is a known .OH radical scavenger, and other inorganic anions may compete with organic solutes for oxidizing sites on the catalyst surface, thereby forming less active oxidizing inorganic radical anions.

TABLE 4

Constituents Concentrations Before and After Ion Exchange (mg/L)

| Constituent | IRN 150 | IR-120 PLUS (Na) |
|---|---|---|
| Bicarbonate | 104/85 | 104/104 |
| Chloride | 19.6/4.4 | 20.7/31.1 |
| Sulfate | 61.6/0 | 61.6/58.8 |
| Aluminum | 2.29/1.09 | 2.82/4.23 |
| Boron | 1.26/2.57 | 1.60/1.71 |
| Calcium | 59.58/2 | 55.29/0.11 |
| Iron | 5.69/4.71 | 3.27/2.97 |
| Potassium | 7.77/2.97 | 7.83/1.45 |
| Magnesium | 2.72/0.03 | 2.70/0.10 |
| Manganese | 0.1/0 | 0.09/0 |
| Sodium | 5.83/2.33 | 6.52/87.1 |
| Silicon | 3.36/8.64 | 3.87/5.36 |

In a further test, a cationic ion exchange resin, IR 120 PLUS(Na) (Rohm and Haas, Philadelphia, Pa.) was compared to the IRN 150 resin. Test runs were conducted using a single reactor and pretreament apparatus as generally described above, under both sunny and rainy conditions. In a first set of test runs, water pretreated wtih the IR 120 PLUS(Na) cationic ion exchange resin was fed to the reactor. In another set of test runs, water pretreated with the above-described IRN 150 resin was fed to the reactor. The second set of test runs using IR 120 PLUS(Na) cationic resin provided only about 20% BTEX destruction, while the first set of runs using IRN 150 provided almost total destruction. The results of the test may be explained because, while fouling species probably were removed by the cationic ion exchange resin, some other species (probably inorganic anions) probably remained in the water and interfered with destruction.

A test was also conducted to determine whether bicarbonate, a known .OH radical scavenger, was a primary destruction inhibitor. In two test runs, the pH of the water from the cationic ion exchange resin column was adjusted to suppress the concentration of bicarbonate (alkalinity). Two Tedllar™ bags were used to collect the water coming from the cationic ion exchange resin. The pH value of the water in the two bags was adjusted from 6.5 to 5.6 and 4.2, respectively, by adding hydrochloride acid (HCl) before introducing the water into the reactor. However, the lower pH provided no positive effect on destruction. With a pH of 5.6, total BTEX destruction was 21.7%, and for pH of 4.2, destruction was 14%. Based on these results, bicarbonate apparently was not a primary cause of BTEX destruction interference in this test.

Ion chromatography (IC) analysis revealed a substantial amount of sulfate ($SO_4^{2-}$) and chloride ($Cl-$) in the contaminated water and in the effluent of the cationic ion exchange resin pretreatment unit, as indicated in Table 4. Several researchers have reported that the photocatalytic destruction of organic compounds is inhibited by some inorganic anions. Destruction interference in this test was probably due to anions present in the water and in the pretreated water entering the reactor from the cationic ion exchange resin.

In another BTEX destruction test, two ¼" ID by 1.0 meter long reactors were compared, one reactor being enclosed in aluminum foil. The test was conducted with the two reactors exposed to identical sunlight conditions. The two reactors were fed with water contaminated with BTEX compounds and including various destruction interfering and catalyst fouling species. The water was filtered through a 0.35 micrometer filter to remove particulate matter, and dissolved oxygen was introduced to a level of about 15 mg/L. The water was not subjected to ion exchange. After three hours of sunlight exposure, the aluminum foil was removed from the first reactor. Both reactors had become grey-yellow colored and the second, the one exposed to sunlight, was much darker. To test the performance of the two reactors, they were immediately fed with water pretreated in a IRN 150 ion exchange resin column. Within about an hour, the color of the first reactor had disappeared, while the second reactor was gradually lightening. The destruction of BTEX compounds was 38% for the first reactor and 27% for the second reactor. Both reactors were then continuously operated overnight with additional water pretreated in the IRN 150 ion exchange resin column. The following morning, the photoactivity of the first reactor was fully recovered, and provided approximately total influent BTEX destruction. However, the second reactor was still yellowish in color and provided BTEX destruction of about 80%. This test demonstrates that catalyst fouling is at least partially induced because of exposure of the reactors to light.

EXAMPLE 12

The same reactor described for Example 11, except only 1 meter long, was utilized with a fluorescent tanning lamp obtained from United States Lighting Corp. (Fenten, Mich.) as the source of UV radiation to destroy a mixture of acetone and methanol in water. More than 92% of the total organic carbon (TOC) was removed in an EBCT of less than 2.5 minutes for an initial mixture including 250 mg/L of acetone and 300 mg/L of methanol.

EXAMPLE 13

Figure 16:
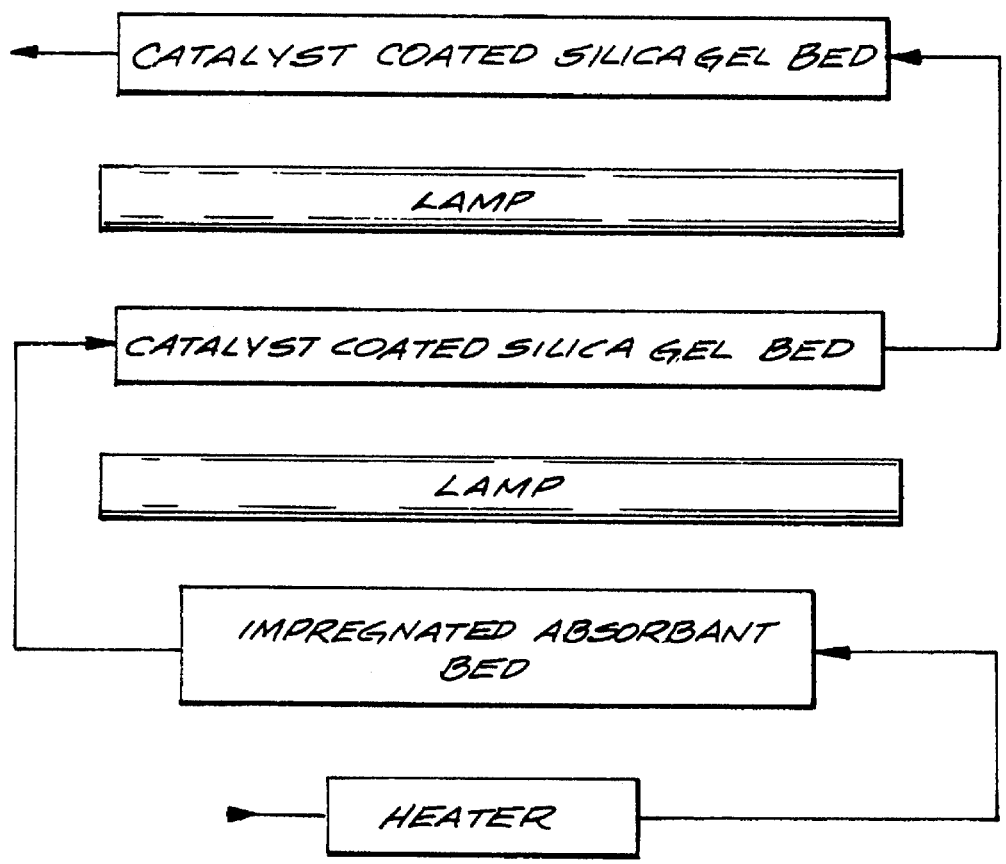
FIG. 16 is a schematic drawing of an apparatus for destroying organic contaminants in liquid and adapted for regenerating the catalyst by backflushing with water.

The apparatus, illustrated schematically in FIG. 16, included three reactors constructed of M-7® plastic tubes. Two of the reactors were 100 cm long tubes having inside diameters of ½" and outside diameters of ⅝", and contained Pt-TiO$_2$ supported on 35×60 mesh size silica gel support. The third reactor was a 25 cm long tube having an inside diameter of ¼" and an outside diameter of ⅜", and contained photocatalyst affixed to an adsorbent support material. The adsorbent support material was 20×50 mesh Ambersorb 563 resin (Rohm & Haas, Philadelphia, Pa.). The photocatalyst was affixed to the adsorbent support material in a two step process. In the first step, 100 ml of solution comprising 80% by volume of titanium isopropoxide (TIP) (Aldrich Chemical Co., Milwaukee, Wis.) was added to a bottle containing 60 grams of the adsorbent. The bottle containing this mixture was stored in a dark environment for 24 hours and periodically inverted to induce mixing. The adsorbent was then transferred to a clean flat plate and placed in a humid environment for about 48 hours to hydrolyze the TIP onto the adsorbent. The resulting TiO$_2$/adsorbent was then dried at 70° C. for two hours, calcined at 500° C. for 3 hours under vacuum, washed with deionized water to remove excess TiO$_2$, and dried at 70° C. for two hours. In the second step, a 3 weight % aqueous slurry of 1% Pt-TiO$_2$ photocatalyst was prepared. The adsorbent impregnated with TiO$_2$ was immersed in this slurry for 10 minutes. The resulting Pt-TiO$_2$/adsorbent was dried at 70° C. for two hours, washed with deionized water, and dried at 105° C. for 12 hours.

Water containing 10 mg/l of Tetrachloroethylene (PCE) was passed through the reactor including adsorbent support material in the dark, at a flow rate of about 10 ml/min for 18 hours. After this adsorption step, the adsorbent reactor was regenerated by backflushing with hot water and exposing it to a UV light source. The hot water was passed at a flow rate of about 20 ml/min and at a temperature of about 80° to 85° C. This regeneration step was conducted for a period of 6 hours. During the regeneration step, the regeneration water from backflushing the adsorbent reactor was passed through the other two reactors connected in series and exposed to a UV light source.

Figure 17:
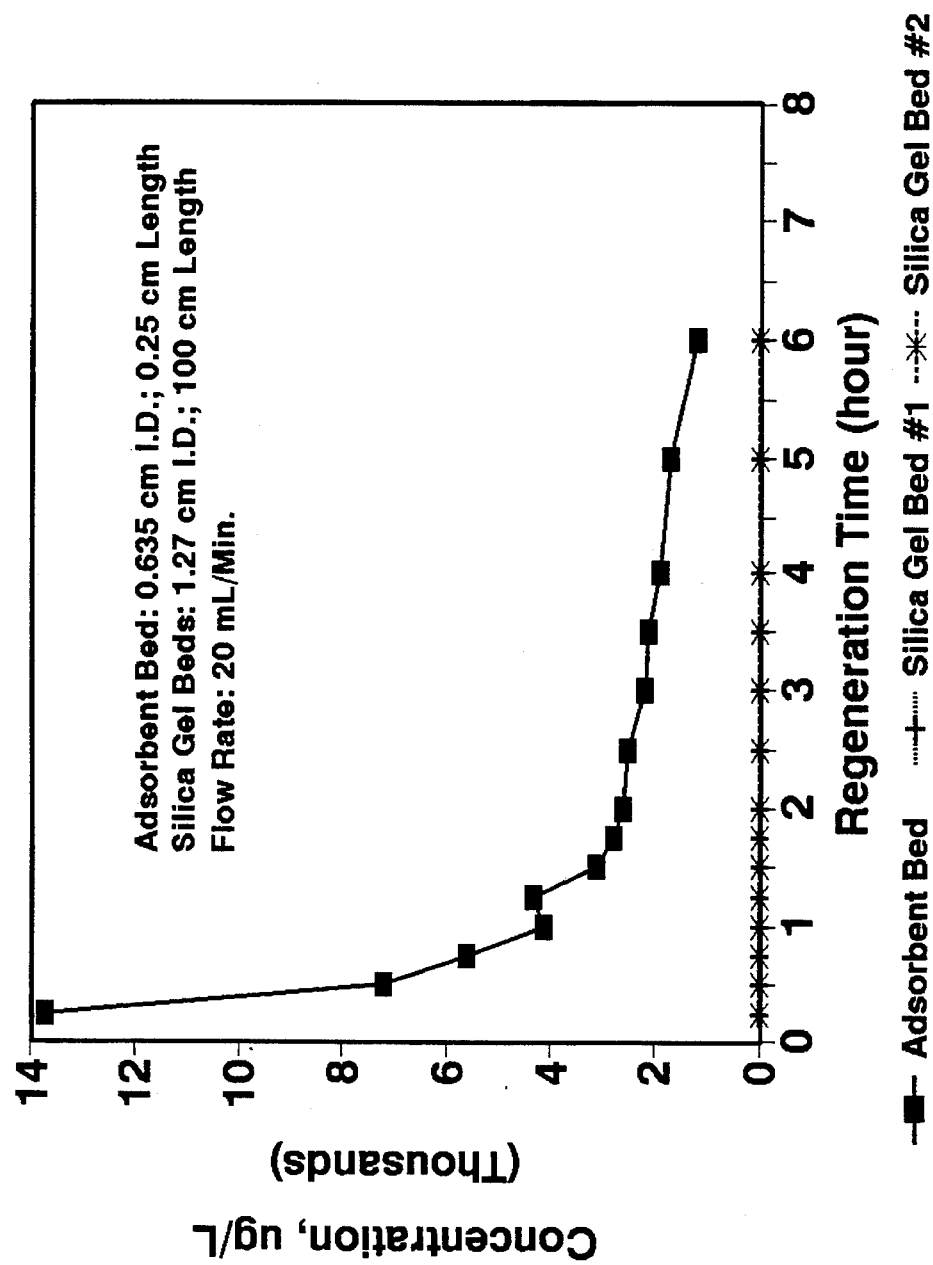
FIG. 17 is a plot of effluent tetrachloroethylene (PCE) concentration as functions of time in the adsorbent bed and two supported photocatalyst beds for regeneration of Ambersorb 563 resin in the apparatus of FIG. 16.
Figure 18:
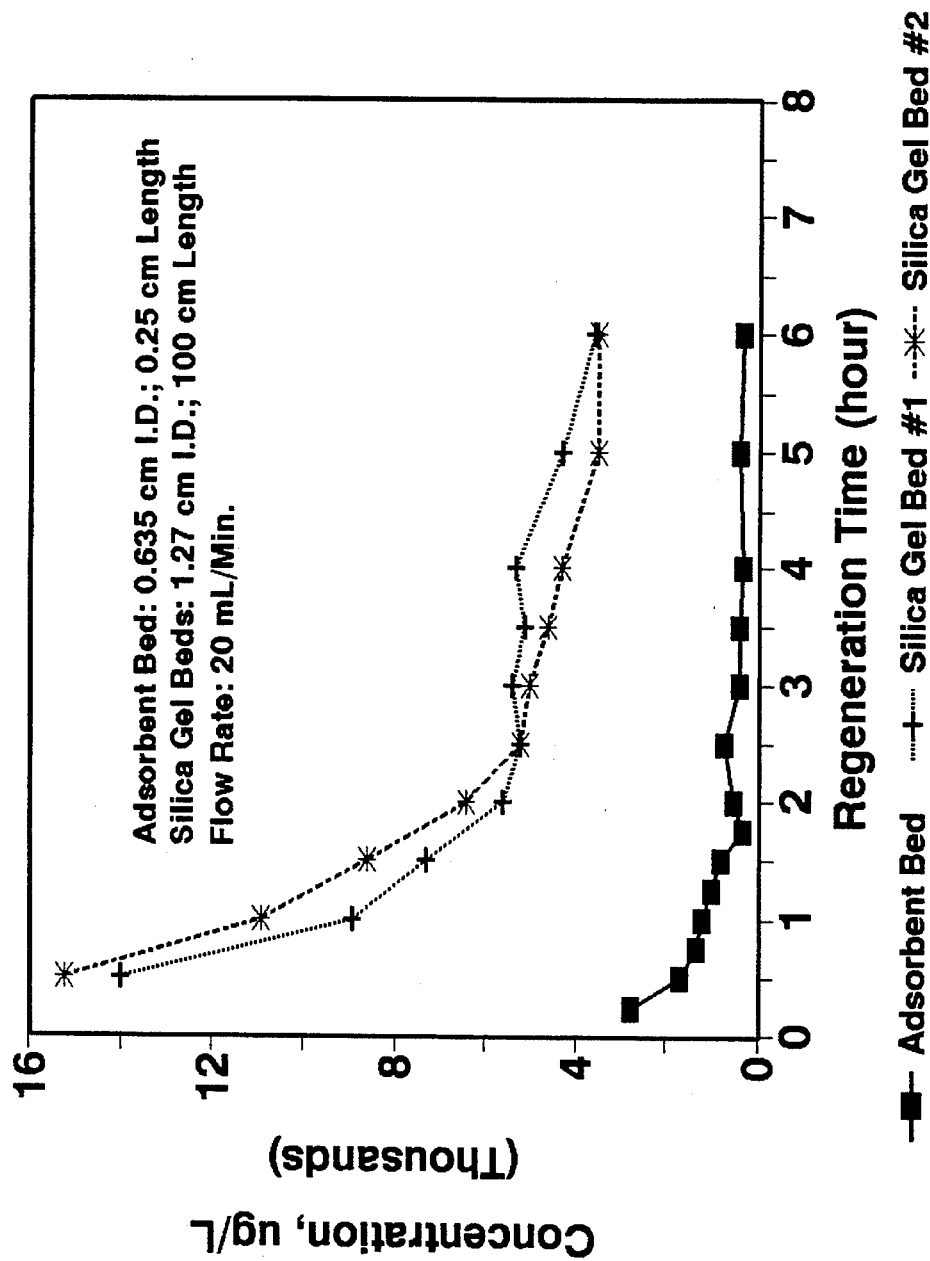
FIG. 18 is a plot of effluent chloride ion concentrations as functions of time in the adsorbent bed and two supported photocatalyst beds for regeneration of Ambersorb 563 resin in the apparatus of FIG. 16.

Samples were taken periodically from the effluent end of each column and analyzed for concentration of PCE and chloride ion. The PCE concentration profiles for the effluent from the adsorbent and the silica gel beds are shown in FIG. 17. The effluent PCE concentration from the second silica gel bed was below 5 µg/l. FIG. 18 shows the chloride ion production profiles, which may also be used to evaluate the destruction of PCE, for the effluents from the three columns. Based on the mass balance analysis, about 106 mg of PCE was adsorbed on the adsorbent support material during the adsorption step of 18 hours, and about 62 mg of PCE was destroyed during the regeneration step of 6 hours. A total of eight such cycles of adsorption and regeneration were conducted, and the overall destruction efficiency was approximately 45%.

Destruction of DBP Precursors in Drinking Water

Examples 14–17 related to the destruction of DBP precursors from drinking water. Two surface waters used for the DBP precursor destruction experiments were Hillsborough River water (HRW) (Tampa, Fla.) and Sacramento-San Joaquin Estuary water (SSJEW) (Antioch, Calif.). These sites were chosen because they represent two important drinking water sources that have experienced problems with DBP control. Water samples included (1) unchlorinated influent and (2) water treated after the alum coagulation step of conventional drinking water treatment processes.

In addition to the 1 weight % Pt-TiO$_2$ photocatalyst described above regarding Examples 1–13, the photocatalysts described below were studied in Examples 14–17. The additional photocatalysts included TiO$_2$ powders synthesized by the low temperature sol-gel process. Six of these TiO$_2$ powders were calcined at temperatures of 50°, 250°, 350°, 450°, 550°, and 650° C. In addition to the Pt-TiO$_2$, four TiO$_2$ powders were substitution doped with Zr, V, Nb, and Me respectively and calcined at 350° C.

EXAMPLE 14

Tests were performed with commercially available TiO$_2$ powder (Aldrich Chemical Co., Milwaukee, Wis.) to evaluate the feasibility of destroying DBP precursors from typical drinking water supplies. The reactor used for these experiments consisted of a 3-liter annular beaker that contained about 2.6L of the drinking water and TiO$_2$ photocatalyst. The light source was a 450-W Hanovia high-pressure quartz mercury-vapor lamp (Ace Glass Company, Vineland, N.J.). The light source was placed in a quartz cooling jacket and placed in the center of the annular beaker so that the distance between the light source and the inner portion of the reactor wall was 5.1 cm. A 5 cm long magnetic stirring bar was placed in the bottom of the reactor to keep the contents well mixed. NPOC was used as an indication of DBP precursor removal. Although NPOC is not a direct measure of DBP precursor destruction, it is an indication that oxidation of organic compounds in the water is occurring. Researchers have correlated DBP precursor removal with NPOC and DOC removal (Rook 1976, Babcock and Singer 1977, and Reckhow and Edzwald 1991). The correlations show that THMFP is linearly proportional to the concentration of DBP precursors and/or NPOC when high dosages of chlorine are used to determine the concentration of DBPs.

The experimental procedure used for these experiments was as follows. Approximately 2.6L of the sample water and a dosage of photocatalyst were placed in the reactor. The initial pH, temperature, and NPOC concentration of the aqueous suspension were measured. At approximately 15 minute time intervals, 45 ml samples of the test water were withdrawn from the reactor and centrifuged for 3 minutes at 500 rpm to separate the TiO$_2$ photocatalyst powder from solution. The water was transferred to 20 ml vials and analyzed for NPOC. After 120 minutes of illumination time, the final pH and temperature were measured, and the remaining solution was centrifuged in 240 ml bottles for 15 minutes at 3,500 rpm. The centrifuged water was then placed in three 250 ml bottles and a 1.0L bottle. The 250-ml samples were then used in the chlorination experiments to determine the DBP formation potential, the concentration of DBPs and the reduction in the DBP precursors.

Tables 5 and 6 display results for experiments performed on the influent and alum coagulated HRW and SSJEW. The results demonstrate that NPOC, THMFP, and the DBP formation potential (DBPFP) can be significantly reduced by a method of the invention.

TABLE 5

| | NPOC, THMFP and DBP Reduction | | | | | |
|---|---|---|---|---|---|---|
| Experimental Conditions | NPOC (µg/L) | THMFP (µg/L) | DBPs (µg/L) | % NPOC Reduction | % THMFP Reduction | % DBP Reduction |
| Influent HRW | 12.5 | 476 | 557 | — | — | — |
| Oxidized Influent HRW[a] | 7.8 | 225 | 230 | 38 | 53 | 59 |
| Oxidized Influent HRW[b] | 2.2 | 24 | 40 | 82 | 95 | 93 |
| Alum Coagulated HRW | 8.5 | 235 | 275 | 32 | 51 | 52 |
| Influent SSJEW | 3.8 | 442 | 465 | — | — | — |
| Oxidized influent SSJEW[a] | 2.3 | 251 | 274 | 39 | 43 | 41 |
| Oxidized Influent SSJEW[c] | 2.2 | 187 | 214 | 42 | 58 | 60 |
| Oxidized Alum Coagulated SSJEW[d] | 4.8 | 180 | 189 | 44 | 23 | 30 |
| Oxidized Alum Coagulated SSJEW[e] | 1.8 | 61 | 38 | 79 | 74 | 85 |

[a]treated with 0.1 wt % TiO$_2$, light intensity 3.0 W/L, 2 hr illumination time.
[b]treated with 0.1 wt % TiO$_2$, light intensity 19 W/L, 2 hr illumination time.
[c]treated with 0.1 wt % TiO$_2$, 16 mg/L H202 per hr, light intensity 3.0 W/L, 2 hr illumination time.
[d]treated with 0.1 wt % TiO$_2$, light intensity 3.0 W/L, 2-hour illumination time.
[e]treated with 0.1 wt % TiO$_2$, light intensity 19 W/L, 2-hour illumination time.

TABLE 6

| | NPOC and THMFP Reduction for Alum Coagulated HRW | | | | | |
|---|---|---|---|---|---|---|
| Contact Time (min.) | Light Intensity (W/L) | NPOC Conc. (mg/L) | THMFP Conc. (µg/L) | NPOC Reduction (%) | THMFP Reduction (%) | Quantum Yield* |
| 0 | — | 5.94 | 288 | — | — | — |
| 15 | 0.91 | 3.82 | 156 | 36 | 46 | 0.061 |
| 30 | 0.91 | 3.60 | 146 | 39 | 49 | 0.034 |
| 45 | 0.91 | 2.78 | 87 | 53 | 70 | 0.030 |
| 60 | 0.91 | 2.10 | 57 | 65 | 80 | 0.028 |
| 15 | 2.51 | 2.92 | 81 | 51 | 72 | 0.031 |
| 30 | 2.51 | 1.81 | 54 | 70 | 81 | 0.021 |
| 45 | 2.51 | 1.30 | 37 | 78 | 87 | 0.016 |
| 60 | 2.51 | 1.12 | 22 | 81 | 92 | 0.012 |

*Based on the contact times shown in the first column.
*Quantum Yield = (moles NPOC destroyed)/(einsteins of LTV received)

EXAMPLE 15

Tests were performed on two surface waters which had been previously treated by alum coagulation. The reactor setup and experimental procedure were similar to that described in Example 14. Instead of using the 3 liter beaker, four 1.8L borosilicate bottles designed for exact tolerances, optical clarity, interior surface smoothness, and freedom from glass imperfections were placed in the water bath next to the light source. The bottles contained the catalyst and reaction mixture of interest. Stirring bars were placed in each bottle to facilitate mixing. A small ring was placed around the light source cooling jacket at the bottom of the water bath to provide a 2 cm space between the bottles and the light source.

The same type of 450 W Hanovia high-pressure quartz mercury-vapor lamp as was described in Example 14 was employed. However, before the lamp was placed in the quartz cooling jacket, it was inserted into a Pyrex glass filter, to screen out radiation with wavelengths of less than 280 nm.

Approximately 1.8 liters of water containing the DBP precursors measured as NPOC was placed in each bottle. The initial dissolved oxygen, pH, and NPOC in each bottle were measured. The bottles were completely covered with aluminum foil, and the required catalyst dosages were then added. The bottles and samples were covered to prevent any exposure to light which might cause oxidation of the DBP precursors. Magnetic stirring bars (5 cm long) were placed in each bottle. Prior to exposing the bottles to the incident light in the reactor, initial NPOC samples were taken from each bottle. These samples were taken to determine the extent of NPOC adsorption. The bottles were placed into the reactor, and the mixing speed of the magnetic stirring bars was adjusted for maximum mixing. 45 ml samples were drawn from each bottle at various time intervals using a 100 ml syringe. Each 45 ml sample was placed in two 20 ml vials, centrifuged at 2300 rpm for 15 minutes, and analyzed for NPOC.

Tests were performed using both surface waters described above to evaluate the feasibility of using a method of the invention for removing DBP precursors. The tests were performed using artificial light intensities of 0.91 and 2.51 W/L. A 1 gm/L dosage of 1.0 weight % Pt-$TiO_2$ photocatalyst, wherein the $TiO_2$ was prepared according to the low temperature sol-gel process, platinized by photo-reduction from hexachloroplatanic acid, and calcined in air at 350° C. for 24 hours, was used. As shown in Table 7, THMFP indicated that DBP precursor destruction ranged from 46% to 80% for reaction times up to 60 minutes.

TABLE 7

| | NPOC & THMFP Results for Alum Coagulated SSJEW | | | | | |
|---|---|---|---|---|---|---|
| Contact Time (min.) | Light Intensity (W/L) | NPOC Conc. (mg/L) | THMFP Conc. (µg/L) | NPOC Reduction (%) | THMFP Reduction (%) | Quantum Yield |
| 0 | — | 2.90 | 239 | — | — | — |
| 15 | 1.43 | 1.60 | 141 | 45 | 41 | 0.042 |
| 30 | 1.43 | 1.28 | 73 | 56 | 70 | 0.026 |
| 45 | 1.43 | 1.12 | 62 | 61 | 74 | 0.019 |
| 60 | 1.43 | 0.96 | 51 | 67 | 79 | 0.016 |

EXAMPLE 16

The feasibility of using a method of the invention for DBP precursor destruction with sunlight as the light source was tested. A series of 1.5L Pyrex bowls were used as reactors. Each reactor had a top cross-sectional area of about 254 $cm^2$ and a depth of 12 cm. Each reactor contained a 1.0L solution containing the surface water and a 1.0 gram sample of the 1.0 weight % Pt-$TiO_2$ photocatalyst described in Example 15. The incident light intensity was about 311.5 µEinstein/min (1.43 W/L) for wavelengths between 300 and 420 nm.

As shown in Table 8, NPOC reductions between 42% and 66%, and THMFP reductions between 50% and 81%, were achieved for reaction times between 15 and 60 minutes. This demonstrates that sunlight can be utilized as a light source to destroy DBP precursors from drinking water supplies.

TABLE 8

| | NPOC and THMFP Results for Alum Coagulated HRW | | | | | |
|---|---|---|---|---|---|---|
| Contact Time (min.) | Light Intensity (W/L) | NPOC Conc. (mg/L) | THMFP Conc. (µg/L) | NPOC Reduction (%) | THMFP Reduction (%) | Quantum Yield* |
| 0 | — | 5.94 | 288 | — | — | — |
| 15 | 1.43 | 3.44 | 144 | 42 | 50 | 0.044 |
| 30 | 1.43 | 3.24 | 98 | 45 | 66 | 0.024 |
| 45 | 1.43 | 2.63 | 77 | 56 | 73 | 0.019 |
| 60 | 1.43 | 2.02 | 56 | 66 | 81 | 0.017 |

*Based on the contact times shown in the first column.

EXAMPLE 17

The feasibility of using a photocatalyst affixed to UV transmissive support material for the removal of DBP precursors from drinking water was tested. The reactor and supported catalyst were the same as in Example 11, and the light source was the same as in Example 12. As shown in Table 9, for a light intensity of 1.9 W/L and empty bed contact times of 7, 9.5, 15 and 30 minutes, NPOC reductions were 46% for a 15 minute period and 59% for a 30 minute period.

TABLE 9

Destruction of DBP Precursors Using Artificial Light
and Photocatalyst Supported on Silica Gel
Alum-Coagulated HRW, Tampa, FL
88 Watt Tanning Lamp, 1.9 mW/cm$^2$
1/2" ID, 5/8" OD, 2 M long M-7 plastic reactor
1 wt. % Pt-TiO$_2$

| EBCT (minutes) | NPOC Concentration (mg/L) | NPOC Reduction (%) |
|---|---|---|
| 0 | 4.9 | — |
| 7 | 3.1 | 37 |
| 15 | 2.5 | 46 |
| 30 | 1.9 | 59 |

We claim:

1. A method for photocatalytic oxidation of organic contaminants in a fluid, said method comprising the steps of:
    (a) providing a reactor including a treatment zone containing a TiO$_2$ photocatalyst affixed to an adsorbent support material, the TiO$_2$ photocatalyst being formed on the adsorbent support material by hydrolysis of a coating of titanium isopropoxide;
    (b) introducing the fluid into said treatment zone for contact with said TiO$_2$ photocatalyst and said adsorbent support material and exposing the fluid and said TiO$_2$ photocatalyst and support material to UV radiation while the fluid is in said treatment zone, for a first period sufficient to destroy a desired amount of the organic contaminants in the fluid and to regenerate the support material;
    (c) continuing to introduce the fluid into said treatment zone for contact with said TiO$_2$ photocatalyst and said adsorbent support material in the absence of UV radiation for a second period when the adsorbent support material is capable of removing organic contaminants from the fluid; and
    (d) optionally repeating steps (b) and (c).

2. A method for photocatalytic oxidation of organic contaminants in a fluid, said method comprising the steps of:
    (a) providing a reactor including a treatment zone containing a TiO$_2$ photocatalyst affixed to an adsorbent support material, the TiO$_2$ photocatalyst being formed on the adsorbent support material by hydrolysis of a coating of titanium isopropoxide;
    (b) introducing the fluid into said treatment zone for contact with said TiO$_2$ photocatalyst and said adsorbent support material and exposing the fluid and said TiO$_2$ photocatalyst and support material to UV radiation while the fluid is in said treatment zone, for a first period sufficient to destroy a desired amount of the organic contaminants in the fluid and to regenerate the support material;
    (c) continuing to introduce the fluid into said treatment zone for contact with said TiO$_2$ photocatalyst and said adsorbent support material in the absence of UV radiation for a second period when the adsorbent support material is capable of removing organic contaminants from the fluid;
    (d) emptying the fluid from said treatment zone;
    (e) flushing said treatment zone with regeneration liquid to transfer organic contaminants from said TiO$_2$ photocatalyst and support material into the regeneration liquid;
    (f) treating the regeneration liquid to destroy organic contaminants contained therein; and
    (g) optionally repeating steps (b), (c), (d), (e) and (f).

3. The method according to claim 1 wherein said reactor includes a UV transmissive portion for admitting UV radiation into said treatment zone.

4. The method according to claim 3 wherein at least a portion of said UV radiation is provided by reflection of sunlight from a reflector panel exterior of said reactor, 5. The method according to claim 3 wherein at least a portion of said UV radiation is provided by an artificial light source.

6. The method according to claim 3 wherein said UV transmissive portion is constructed of UV transmissive material.

7. The method according to claim 6 wherein said treatment zone of said reactor includes an elongated tubular member constructed of UV transmissive material.

8. The method according to claim 6 wherein said treatment zone of said reactor is a shallow tank covered by UV transmissive material.

9. The method according to claim 6 wherein said UV transmissive material is transmissive of at least about 20% of incident ultraviolet radiation.

10. The method according to claim 6 wherein said UV transmissive material is transmissive of at least about 40% of incident ultraviolet radiation.

11. The method according to claim 6 wherein said UV transmissive material is transmissive of at least about 80% of incident ultraviolet radiation.

12. The method according to claim 1 wherein said support material is transmissive of at least about 1% of incident ultraviolet radiation.

13. The method according to claim 1 wherein said support material is transmissive of at least about 45% of incident ultraviolet radiation.

14. The method according to claim 1 wherein the amount of said photocatalyst is between about 0.05 weight % and about 50 weight %, based on the weight of the support material.

15. The method according to claim 1 wherein the amount of said photocatalyst is between about 0.1 weight % and about 10 weight %, based on the weight of the support material.

16. The method according to claim 1 wherein said catalyst is TiO$_2$ in anatase crystalline form or rutile crystalline form.

17. The method according to claim 1 wherein said photocatalyst includes a surface modifier selected from the group consisting of noble metals, transition metals, and mixtures thereof.

18. The apparatus according to claim 1 wherein said photocatalyst includes a substitution dopant selected from the group consisting of noble metals, transition metals, and mixtures thereof.

19. The method according to claim 1 wherein said fluid is drinking water and said organic contaminants are disinfection by-product precursors.

20. The method according to claim 1 and further comprising before step (a) the step of introducing the fluid into a pretreatment unit including pretreatment means.

21. The method according to claim 20 wherein said pretreatment means includes one or more of the following: means for filtering the fluid, means for introducing dissolved oxygen into the fluid, and means for removing ions from the fluid.

22. The method according to claim 1 wherein the treatment zone further includes $Pt-TiO_2$ affixed to the adsorbent support material.

23. The method according to claim 2 wherein the treatment zone further includes $Pt-TiO_2$ affixed to the adsorbent support material.

* * * * *